US007012393B2

(12) United States Patent
De Frutos et al.

(10) Patent No.: US 7,012,393 B2
(45) Date of Patent: Mar. 14, 2006

(54) MOTOR DRIVE

(75) Inventors: Xavier De Frutos, Aix en Provence (FR); André Mourrier, Sainte Tulle (FR); Chikyam Lee, La Roque d'Antheron (FR)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/091,220

(22) Filed: Mar. 28, 2005

(65) Prior Publication Data

US 2005/0231146 A1    Oct. 20, 2005

Related U.S. Application Data

(60) Provisional application No. 60/574,443, filed on May 25, 2004, provisional application No. 60/574,441, filed on May 25, 2004, provisional application No. 60/557,493, filed on Mar. 30, 2004.

(51) Int. Cl.
*H02K 17/32* (2006.01)
(52) U.S. Cl. .................. 318/434; 318/432; 318/434
(58) Field of Classification Search ............... 318/434, 318/806, 811, 801, 802, 798, 433, 438
See application file for complete search history.

(56) References Cited

U.S. PATENT DOCUMENTS 5,825,597 A * 10/1998 Young ........................ 361/31

* cited by examiner

*Primary Examiner*—Karen Masih
(74) *Attorney, Agent, or Firm*—Ostrolenk, Faber, Gerb & Soffen, LLP

(57) ABSTRACT

A motor drive comprising a first power semiconductor switching device having a pair of main current carrying terminals, the main current carrying terminals being coupled in series with a motor load; a first current control loop, the current control loop having a current sensor for the switching device for controlling the current through the switching device; a current limiting circuit driving the first current control loop to maintain the current in the switching device at a desired level, the current limiting circuit having first and second inputs; a speed regulation circuit having a first input coupled to a speed control input and a second input coupled to a feedback voltage from the motor representing the actual motor speed, the speed regulation circuit providing an output to the first input of the current limiting circuit to drive the motor to the desired motor speed; and a power limitation circuit for limiting the power consumed by the motor to a predetermined level and providing an output to the second input of the current limiting circuit, the power limitation circuit having an input coupled to receive the feedback voltage from the motor.

27 Claims, 22 Drawing Sheets

IN_V cap. (F) = 150μ / Sv

IN_V cap. (F) > _ τ / 100k

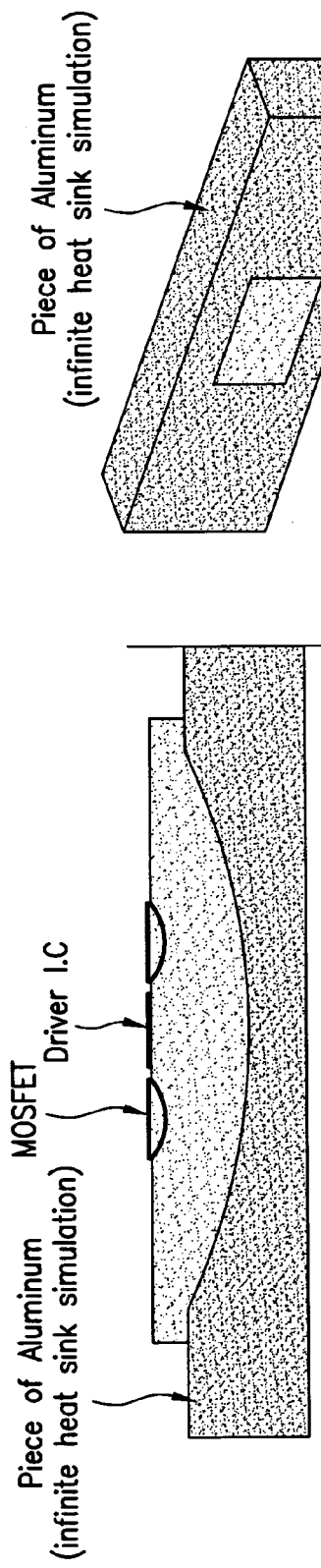
Figure 19A
Figure 19B
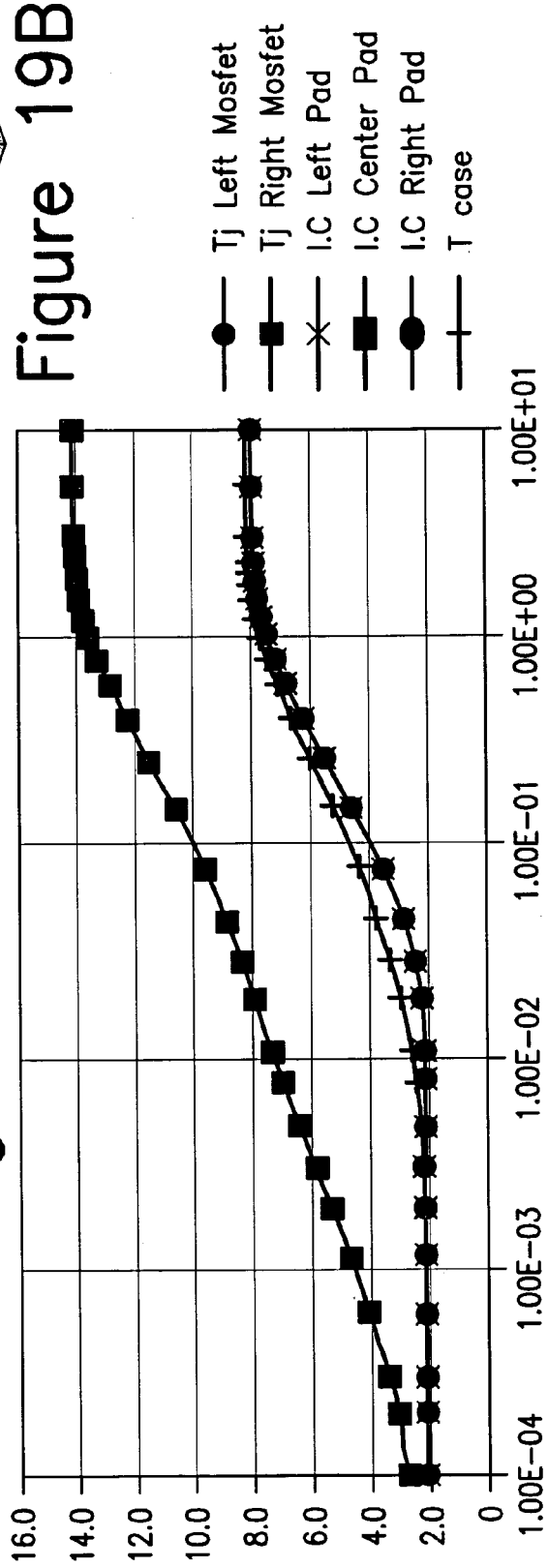
Figure 20

MOTOR DRIVE

CROSS REFERENCE TO RELATED APPLICATIONS

The present application is related to and claims the benefit and priority of the following U.S. provisional applications: U.S. Application Ser. No. 60/557,493 filed Mar. 30, 2004 and entitled FULLY INTEGRATED LINEAR CABIN FAN CONTROLLER; U.S. Application Ser. No. 60/574,441 filed May 25, 2004 and entitled FULLY INTEGRATED LINEAR CABIN FAN CONTROLLER, and U.S. Application Ser. No. 60/574,443 filed May 25,2004 and entitled BLOWER STRUCTURE WITH CONVERSION OF PWM DUTY CYCLE TO OUTPUT VOLTAGE; the entire disclosures of each of which is hereby incorporated by reference herein.

BACKGROUND OF THE INVENTION

The present invention relates to a DC power supply and in particular, a DC motor drive and more particularly, to an integrated, fully protected DC motor drive, for example, for DC brushed motors. In particular, the present invention relates to a fully integrated motor drive circuit including the power switches as well as an integrated circuit used in the motor drive circuit.

There is a need for DC motor drives particularly in the range of 100 to 350 watts and powering DC motors in the 12 to 14 volt range, for example used in automotive applications, such as for blower fan motors. There is also need for a controller integrated circuit for controlling such DC motors.

SUMMARY OF THE INVENTION

The present invention provides a DC motor controller providing programmability over a wide range of motor characteristics as well as protection for the controller circuit and load. These protection techniques include imbedded temperature management to minimize the risk of MOSFET switch thermal runaway. The open architecture of the controller also makes a simple design capable of driving different types of motors or load applications.

According to the invention, a self-adaptive PWM input is provided which will interface with most HVAC system processor speed signals. Power dissipation is monitored and controlled by reducing motor current. Furthermore, as protection, the circuit shuts down the control integrated circuit in the event of excessive power switch junction temperature. The integrated circuit and the motor are then protected without any external sensor thus greatly simplifying design.

A heat sink provides thermal cooling for the power transistor switches contained in the integrated circuit controller. Protection strategies including variable current limitation versus motor speed or temperature derated performance may be employed.

According to one aspect, the invention comprises a motor drive comprising a first power semiconductor switching device having a pair of main current carrying terminals, the main current carrying terminals being coupled in series with a motor load; a first current control loop for the switching device, the loop having a current sensor for the switching device for controlling the current through the switching device; a current limiting circuit driving the first current control loop to maintain the current in the switching device at a desired level, the current limiting circuit having first and second inputs; a speed regulation circuit having a first input coupled to a speed control input and a second input coupled to a feedback voltage from the motor representing the actual motor speed, the speed regulation circuit providing an output to the first input of the current limiting circuit to drive the motor to the desired motor speed; and a power limitation circuit for limiting the power consumed by the motor to a predetermined level and providing an output to the second input of the current limiting circuit, the power limitation circuit having an input coupled to receive the feedback voltage from the motor.

In a preferred embodiment, first and second power switching devices are coupled so as to have their main current carrying terminals connected in parallel, and there are provided first and second current control loops, one for each power switching device, with a current sensor for each power switching device, whereby the current in each power switching device can be controlled independently.

Other features and advantages of the present invention will become apparent from the following detailed description of the invention which refers to the accompanying drawings.

BRIEF DESCRIPTION OF THE DRAWING(S)

The invention will be described in greater detail in the following detailed description with reference to the drawings in which.

Figure 5:
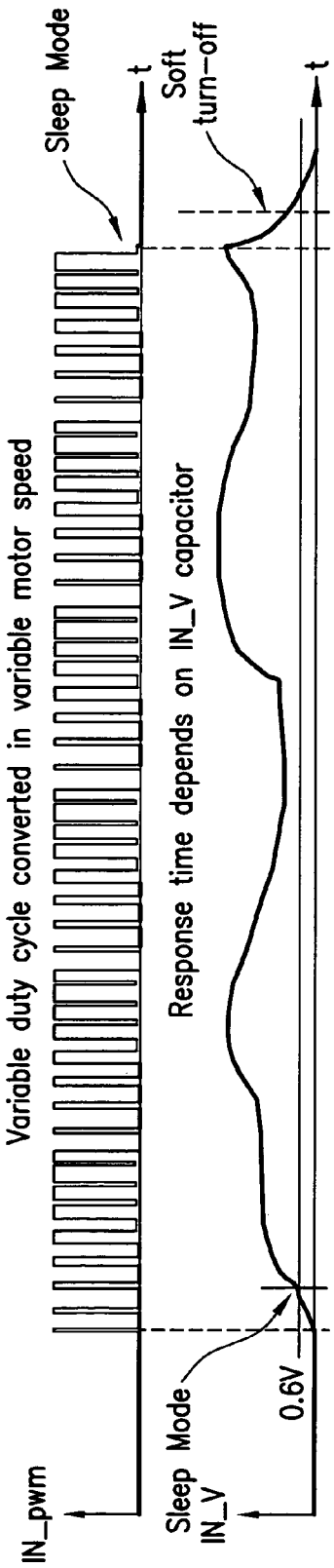
Figure 6:
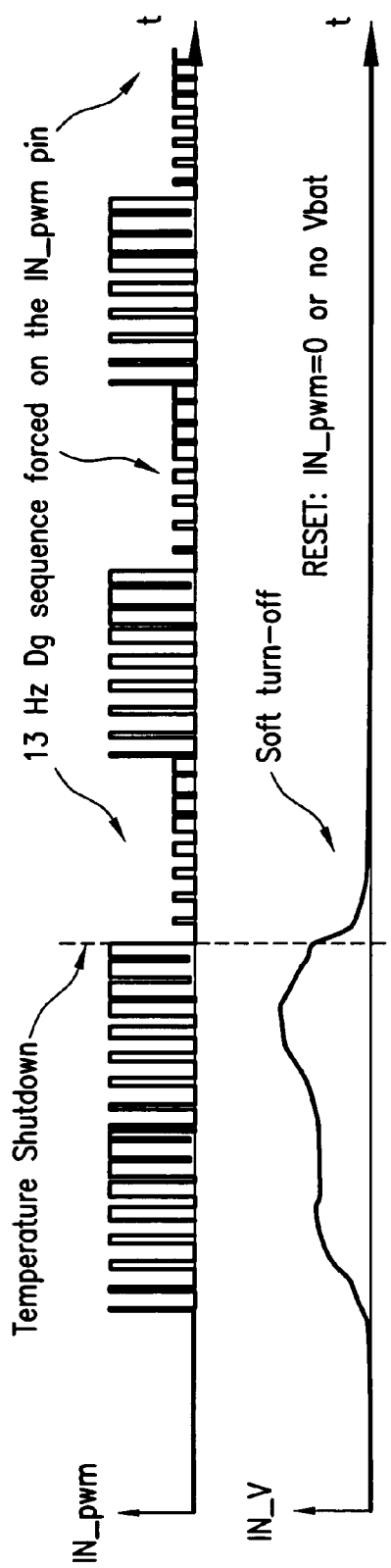
Figure 7:
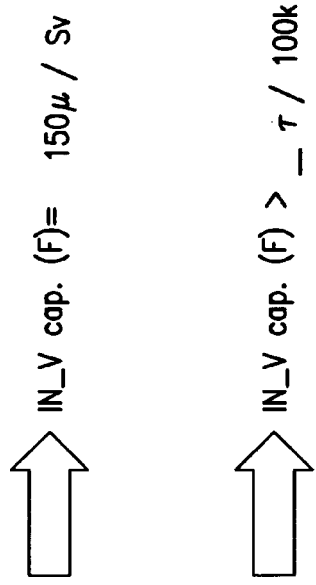
Figure 7:
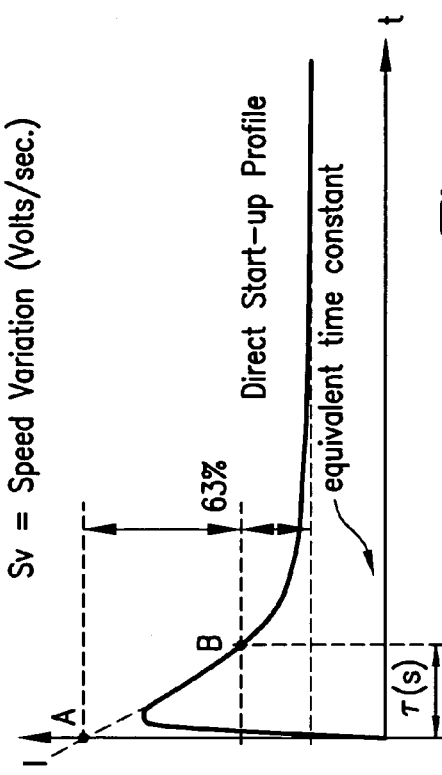
Figure 8:
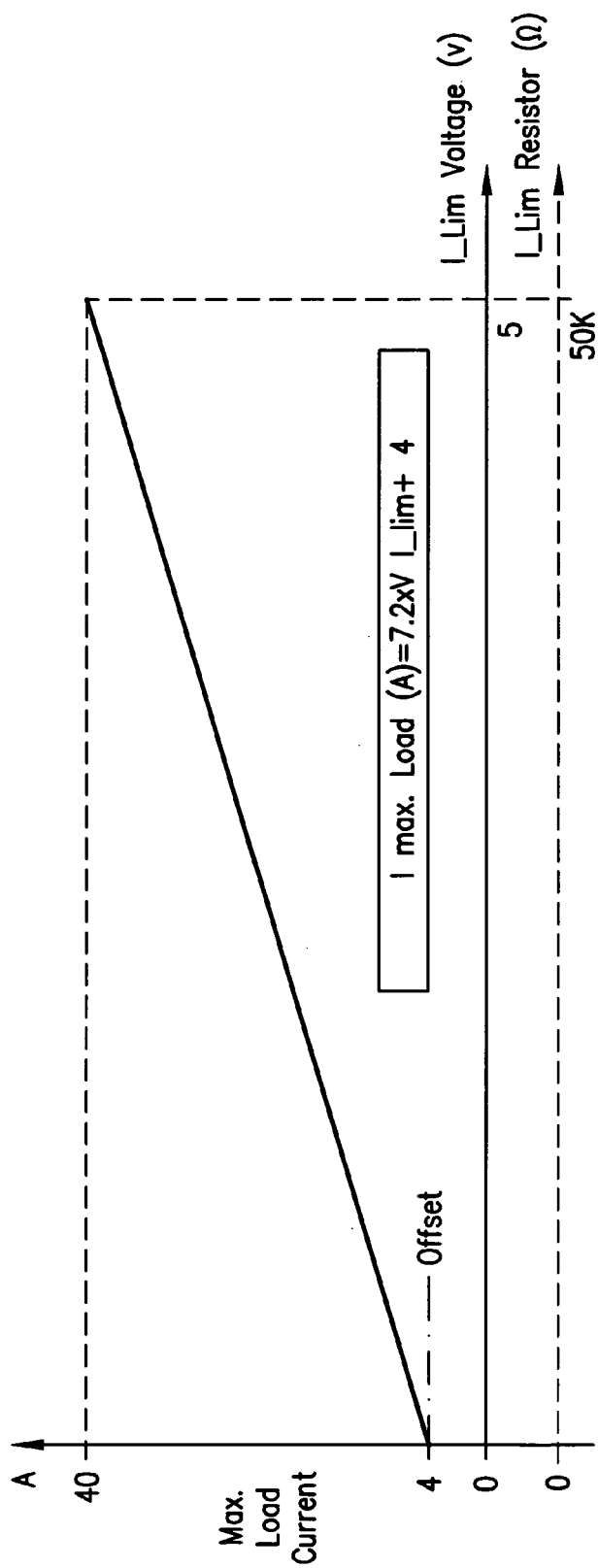
Figure 9:
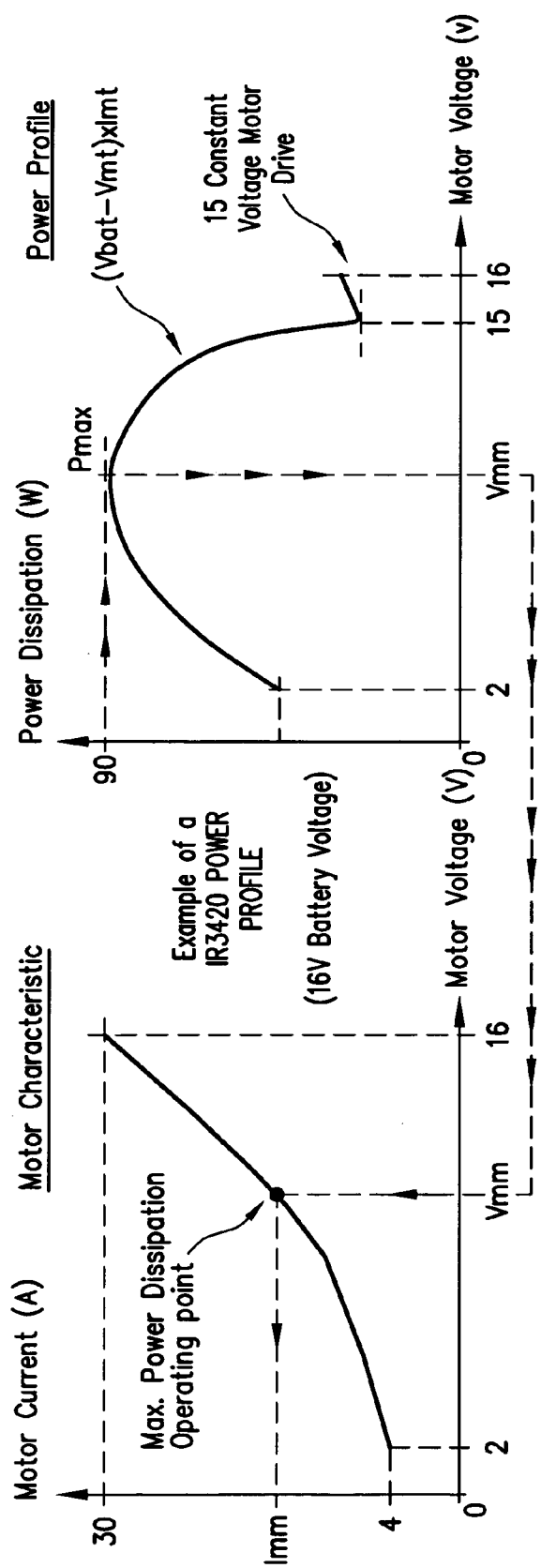
Figure 10:
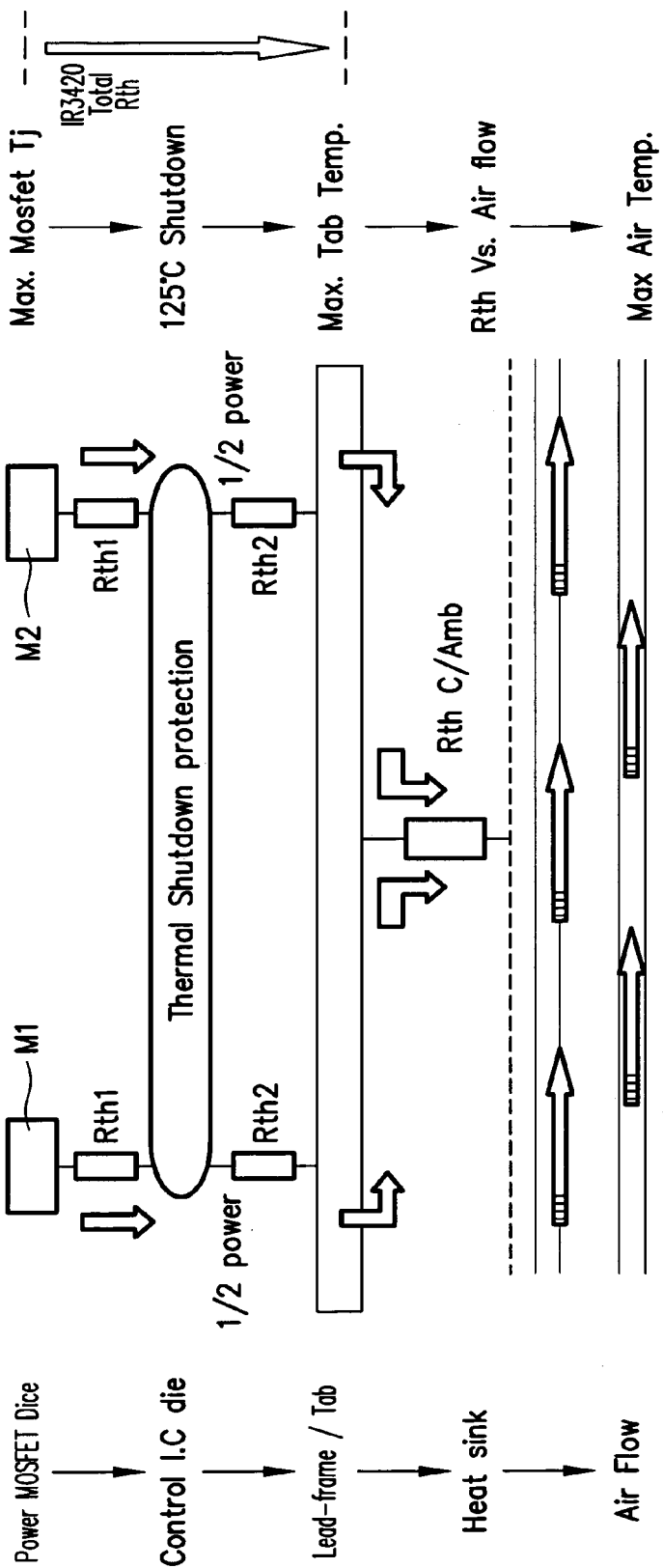
Figure 11:
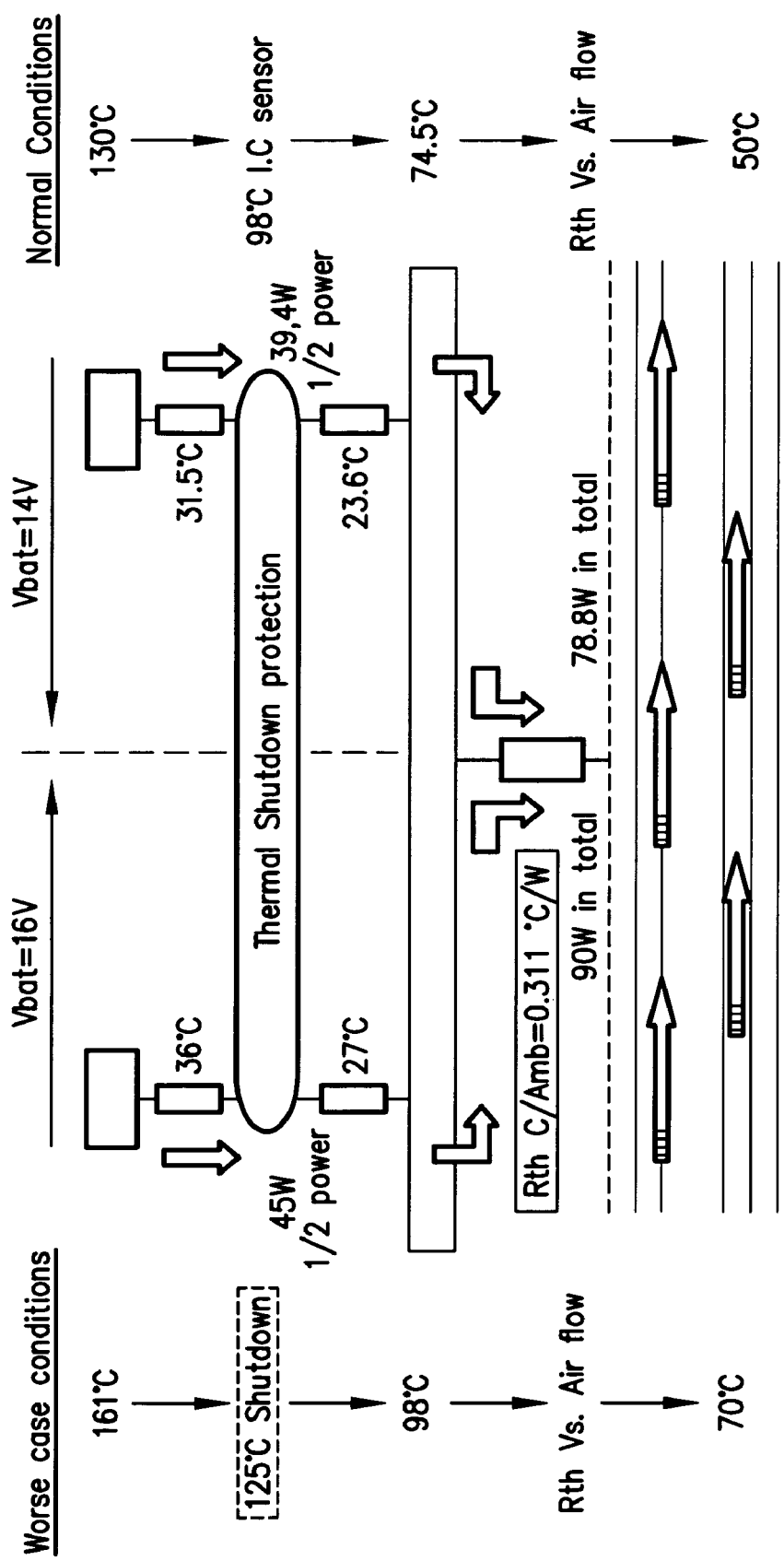
Figure 12:
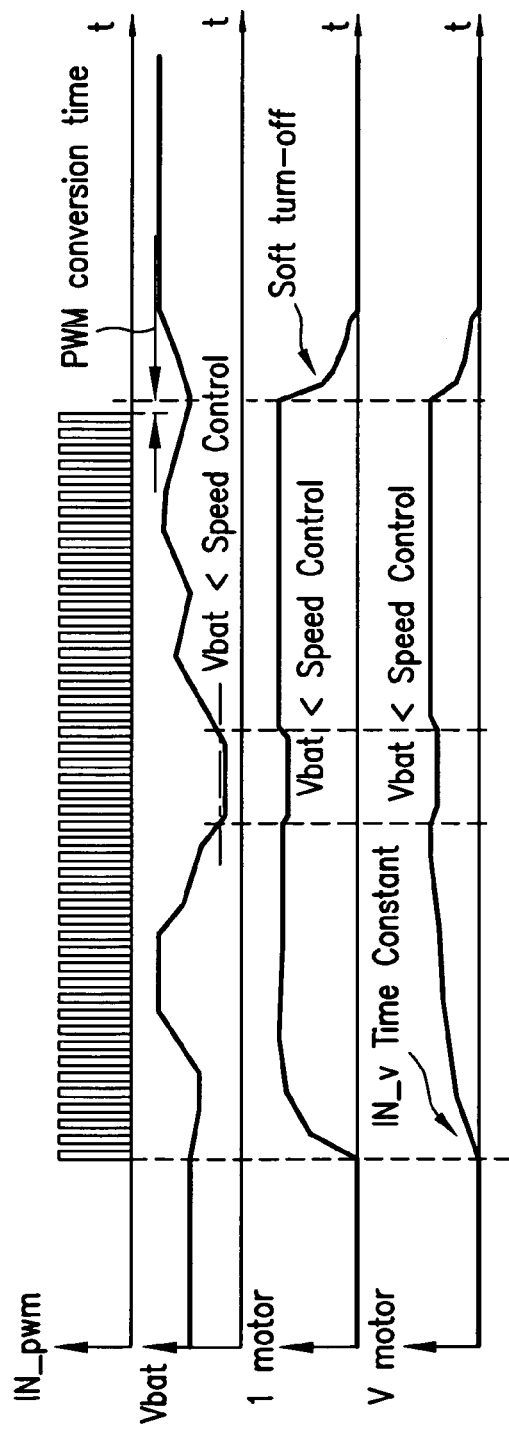
Figure 13:
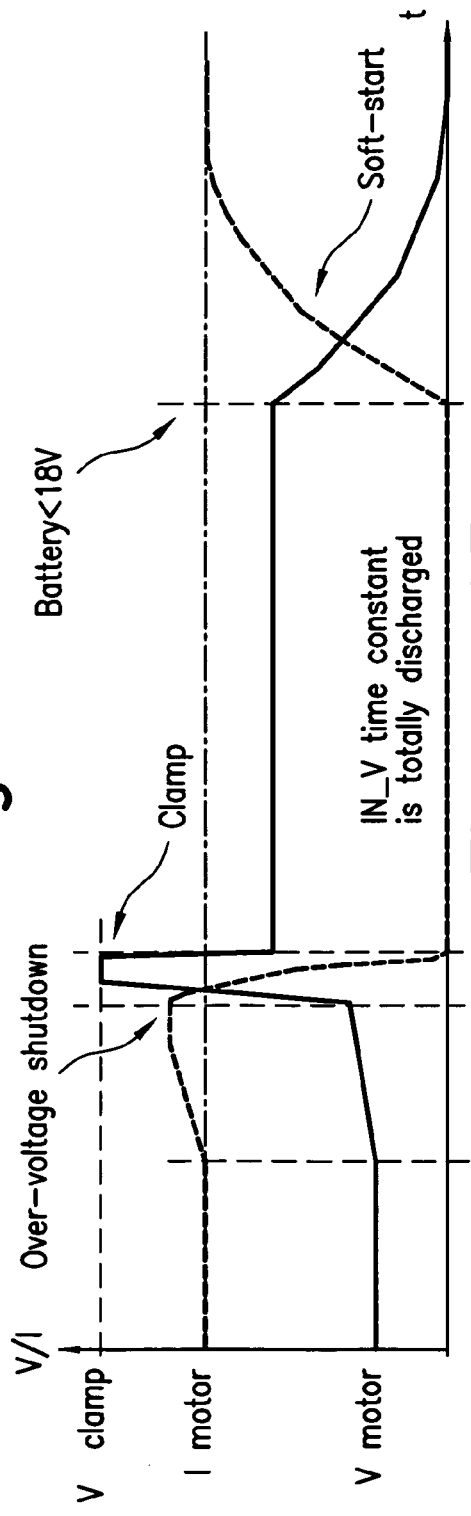
Figure 14:
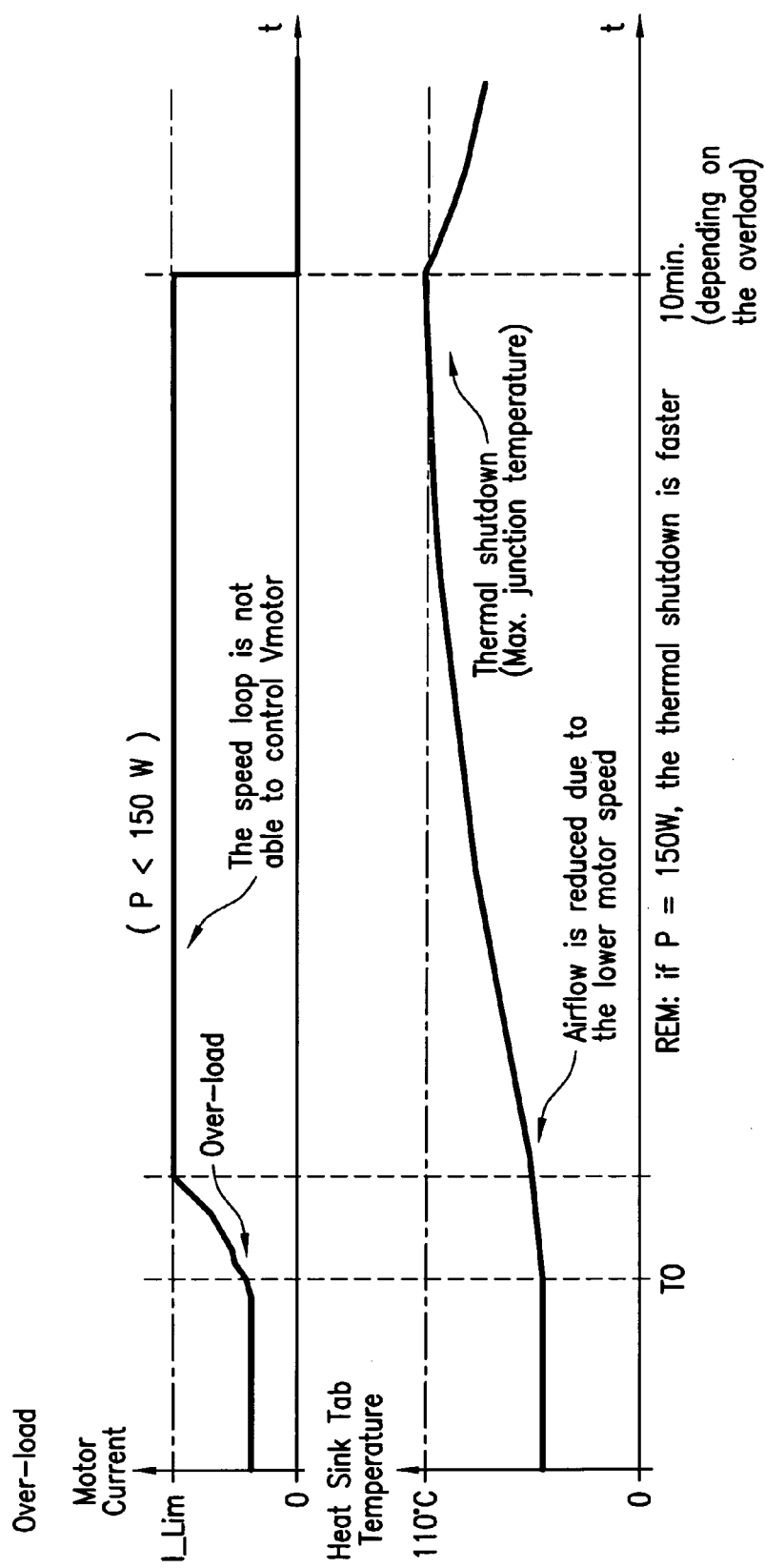
Figure 15:
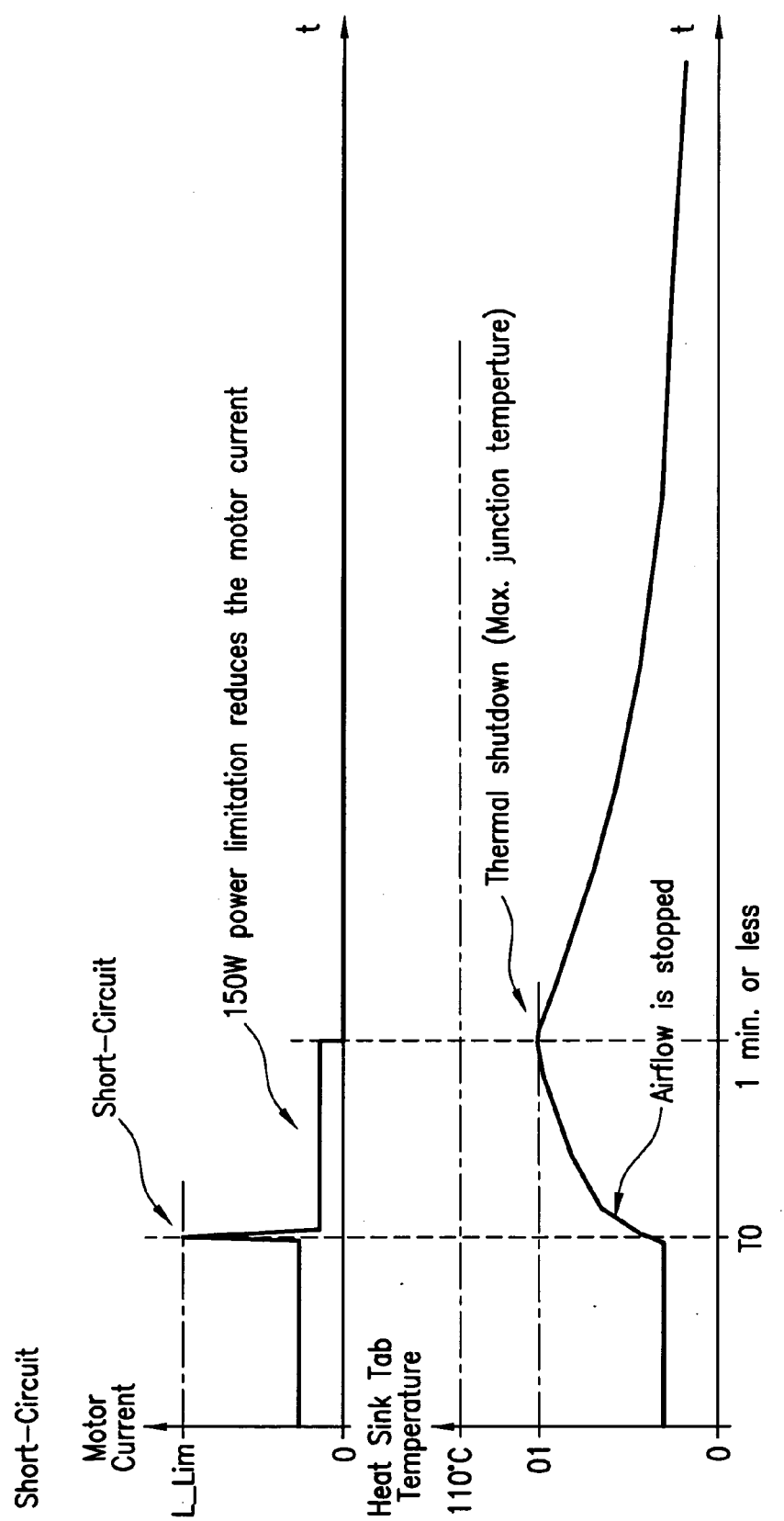
Figure 16:
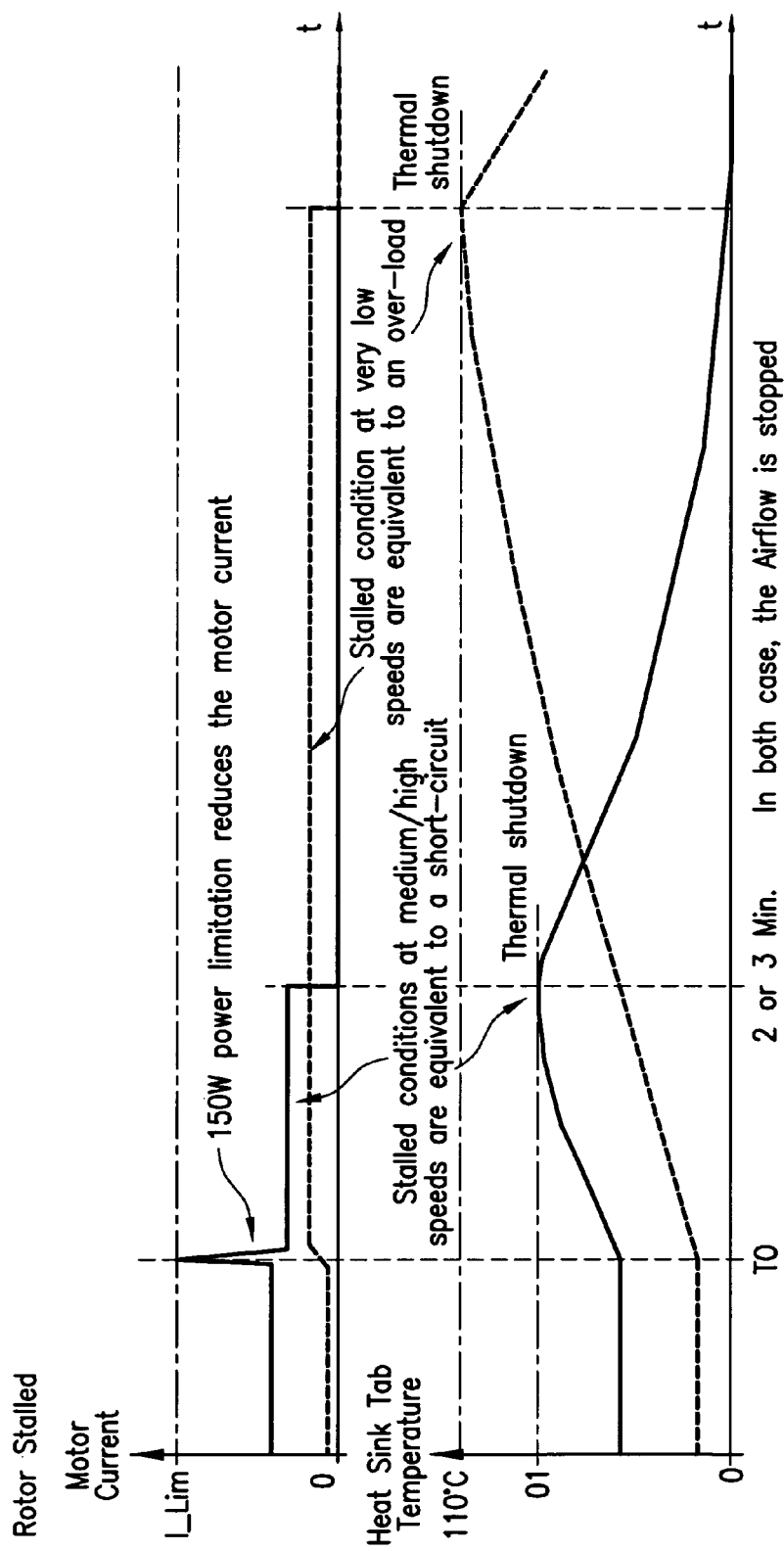
Figure 17:
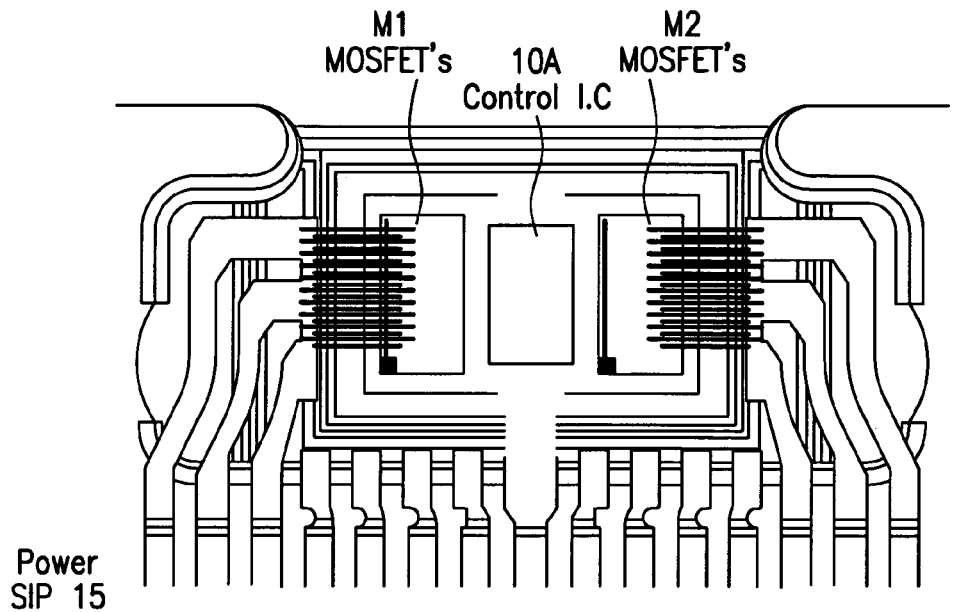
Figure 17A:
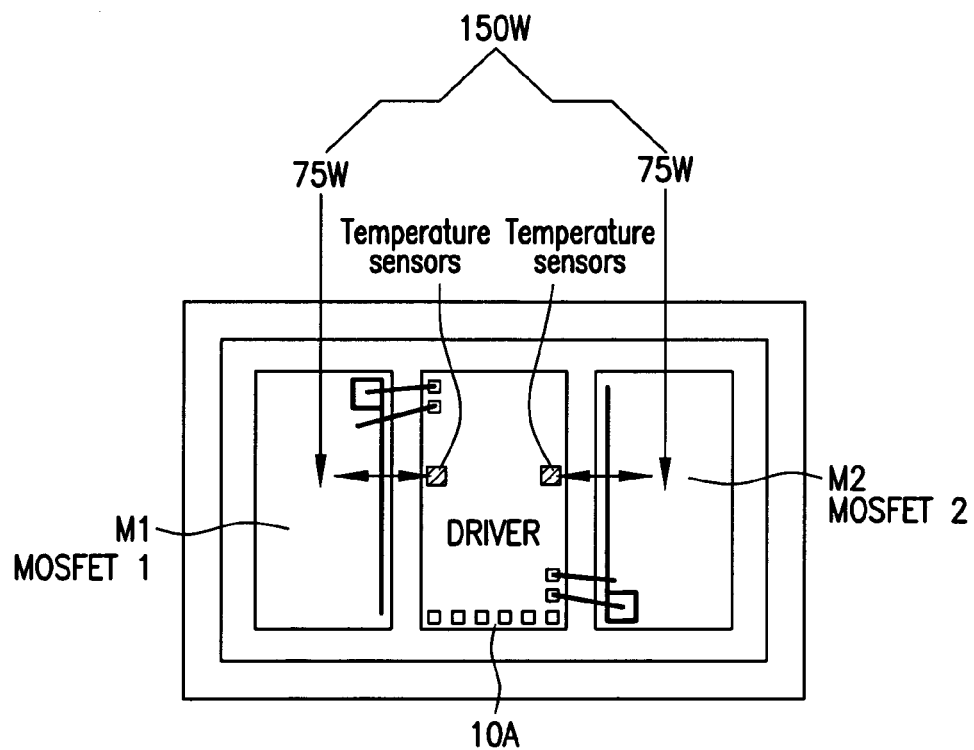
Figure 18:
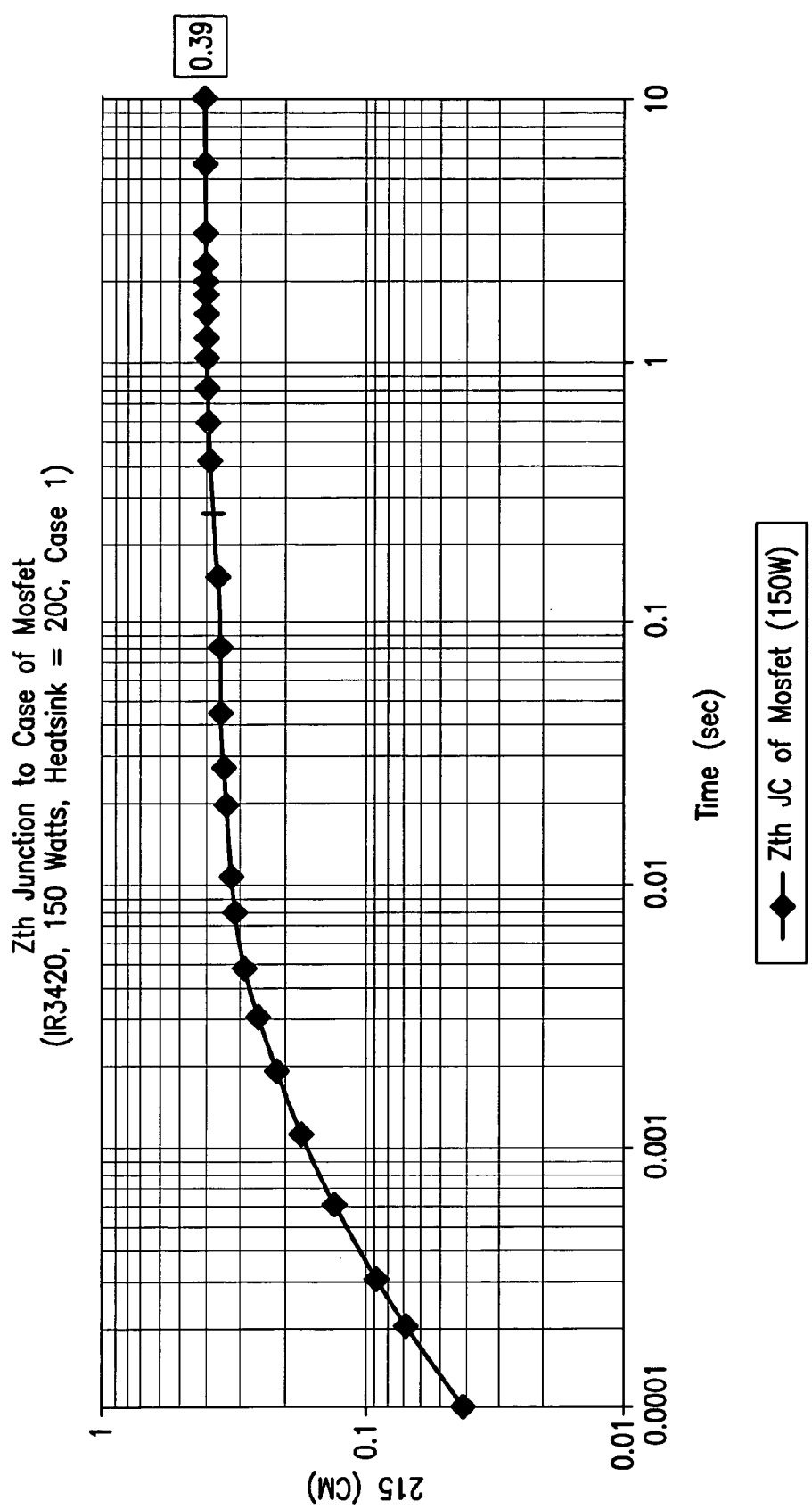
Figure 21:
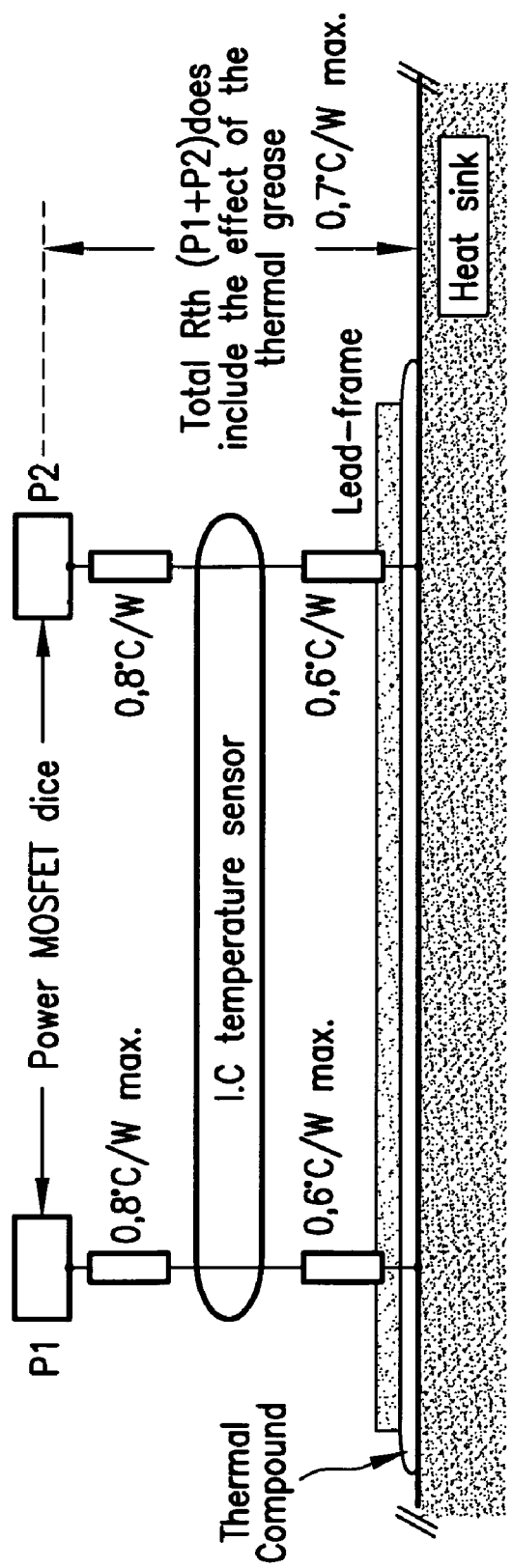
Figure 22A:
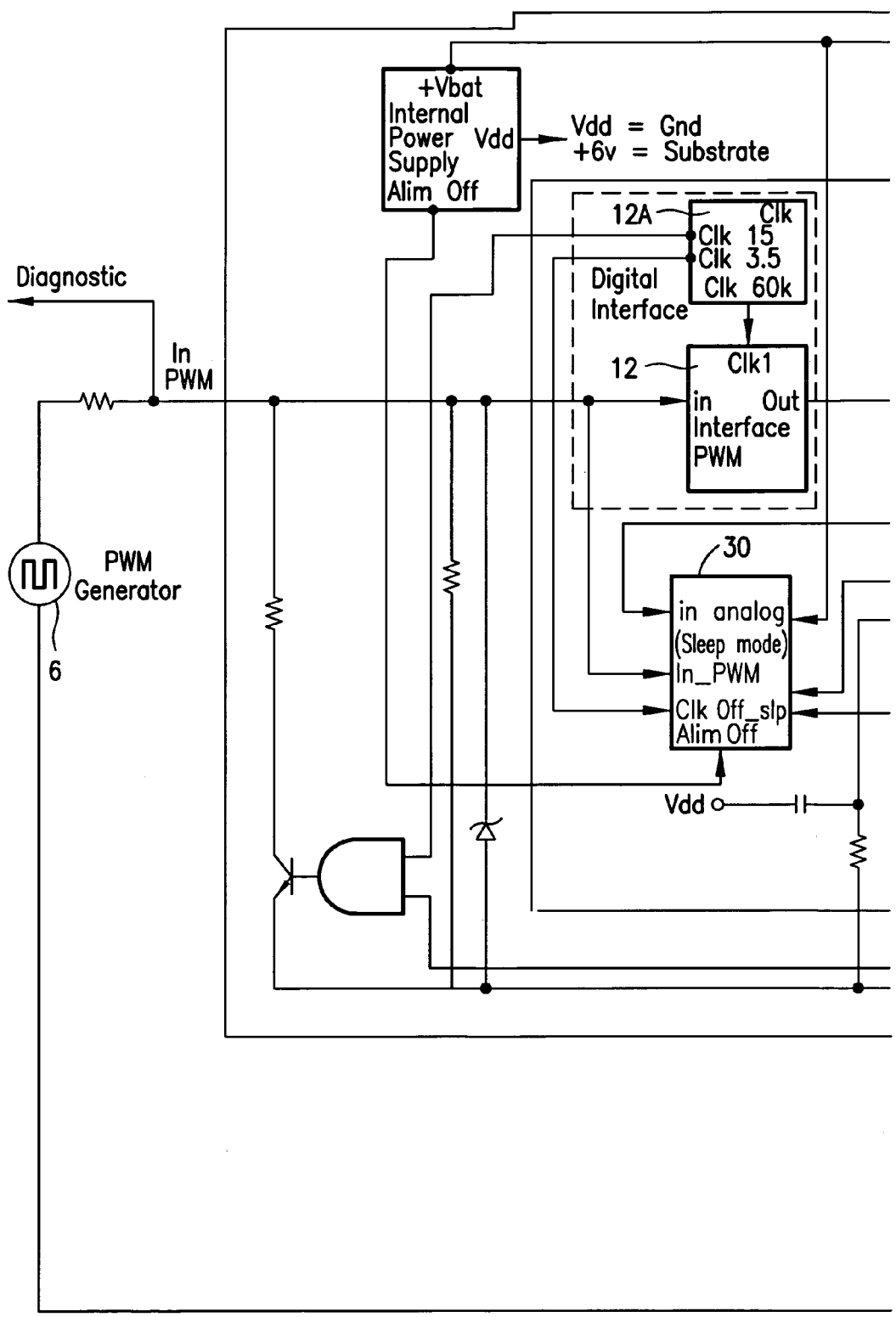
Figure 22B:
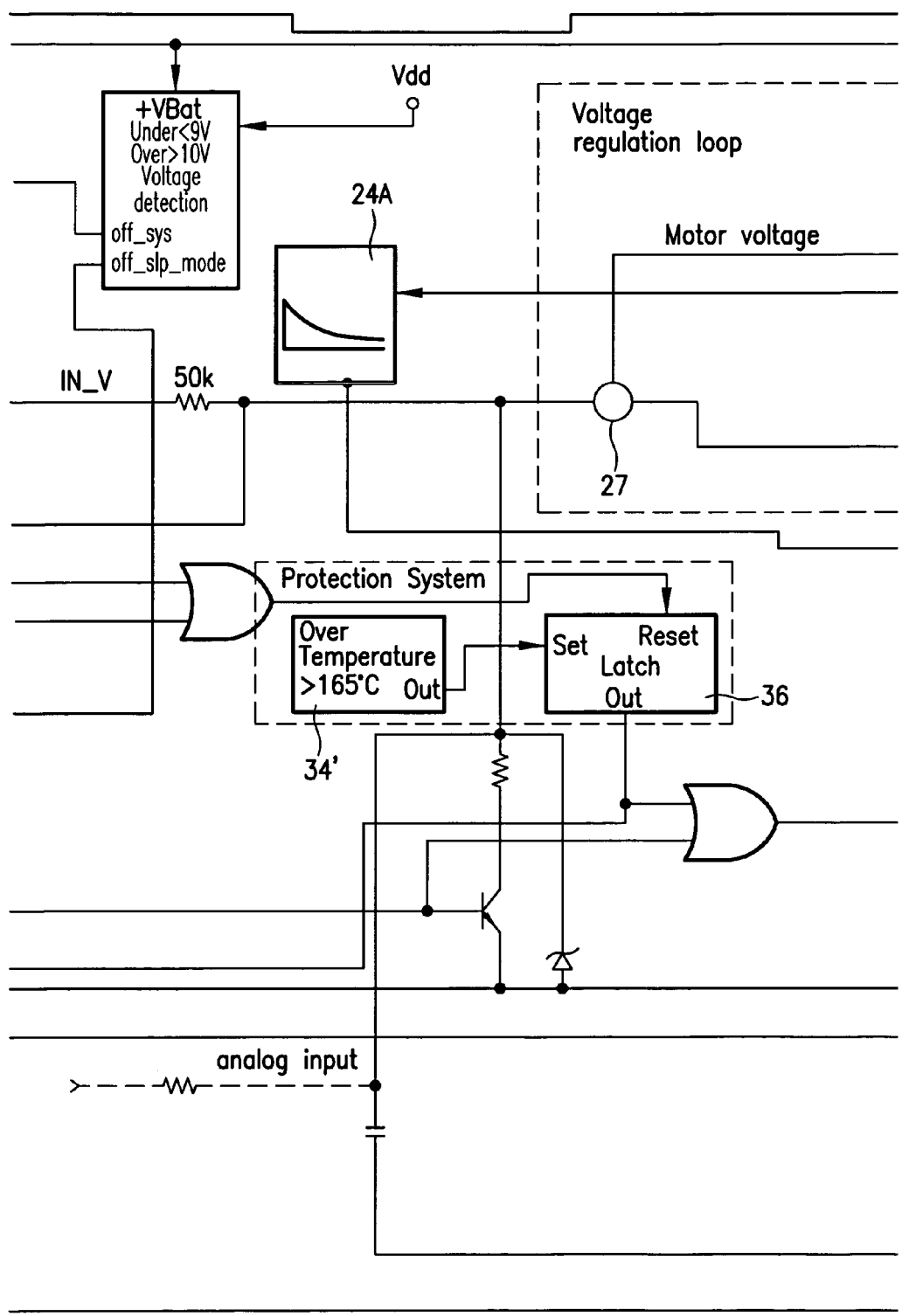
Figure 22C:
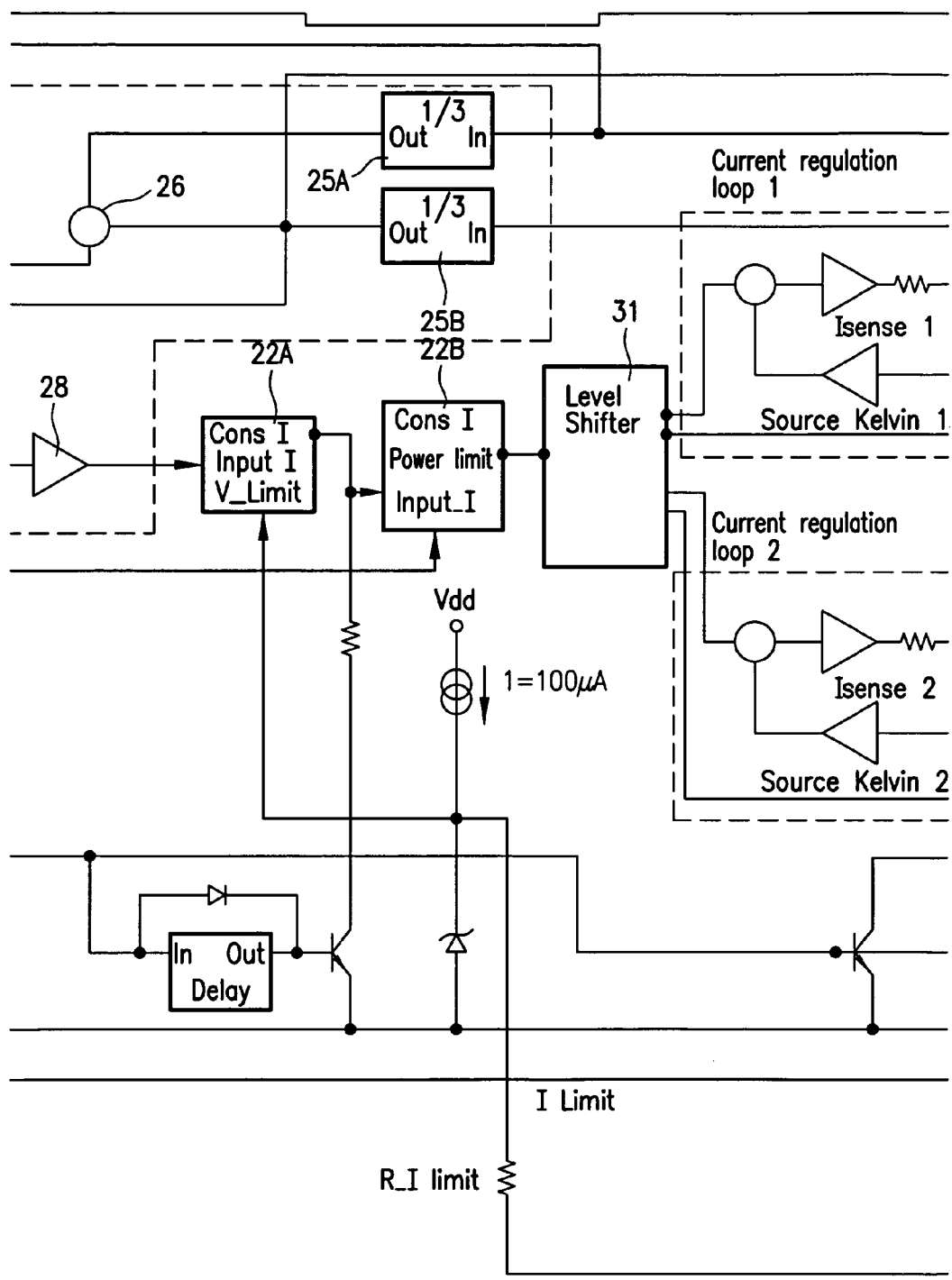
Figure 22D:
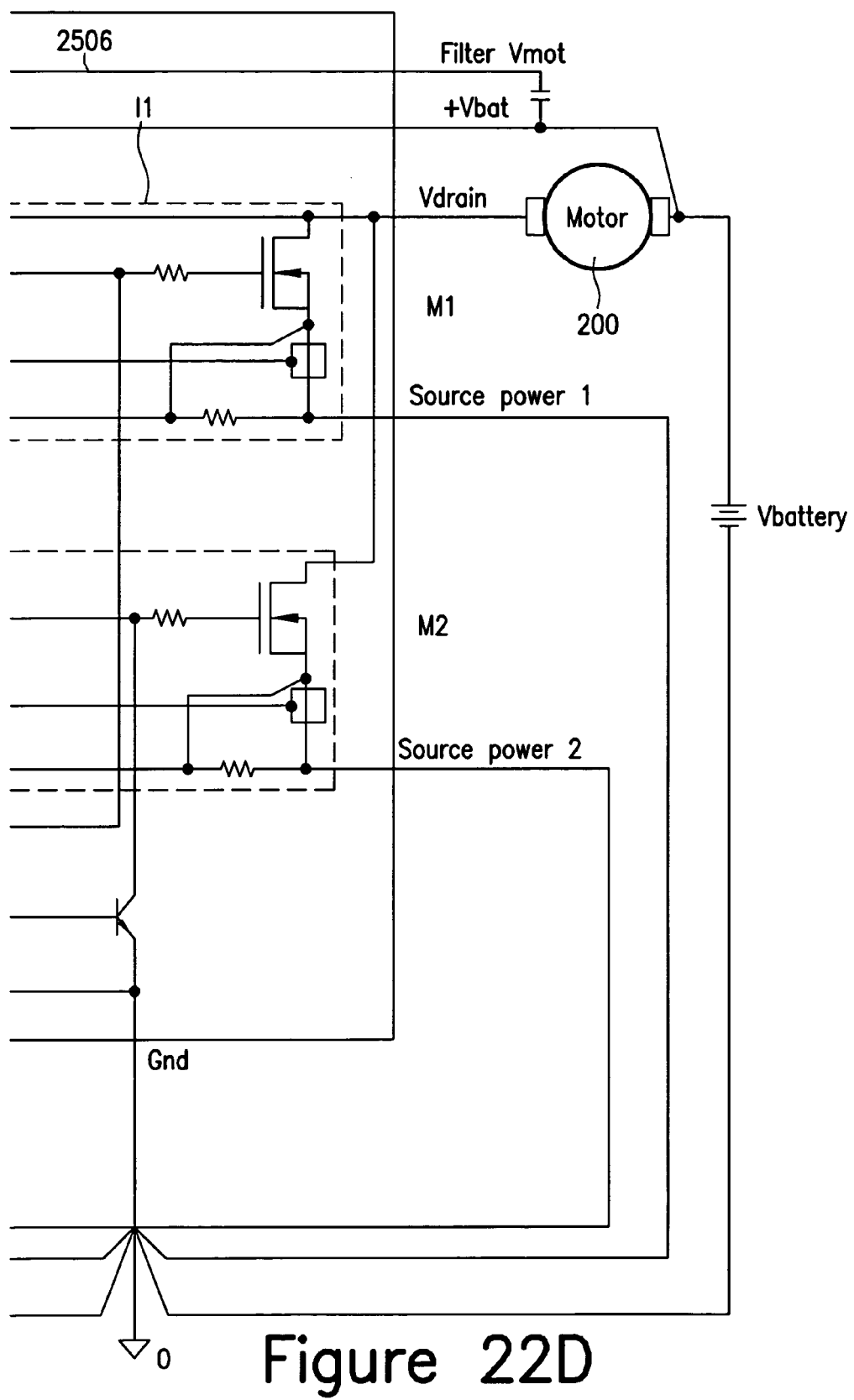

FIG. 5 graphs the input PWM signal and the converted analog signal;

FIG. 6 shows another example of the input PWM signal and the converted analog signal;

FIG. 7 shows a direct start-up profile method to determine C IN_V;

FIG. 8 is a graph relating maximum load current to a programmable voltage;

FIG. 9 presents graphs showing motor current and power dissipation;

FIG. 10 shows the heat transfer through the integrated circuit;

FIG. 11 is a further graph relating to the heat transfer;

FIG. 12 shows further waveforms for the circuit;

FIG. 13 is provided to explain the over-voltage protection;

FIG. 14 is provided to explain overload protection;

FIG. 15 shows how the circuit operates in the event of a short circuit;

FIG. 16 shows how the circuit operates in the event of a stalled rotor;

FIG. 17 shows the packaging of the integrated circuit;

FIG. 17A shows the die assembly on the copper substrate;

FIG. 18 shows a graph of the transient Rth;

FIG. 19 illustrates the packaging of the MOSFET switch and the driver IC in a side view;

FIG. 20 shows the junction temperature of the I.C and the MOSFETs (thermal response time);

FIG. 21 is a simplified view of the assembly total Rth; and

Figure 1A:
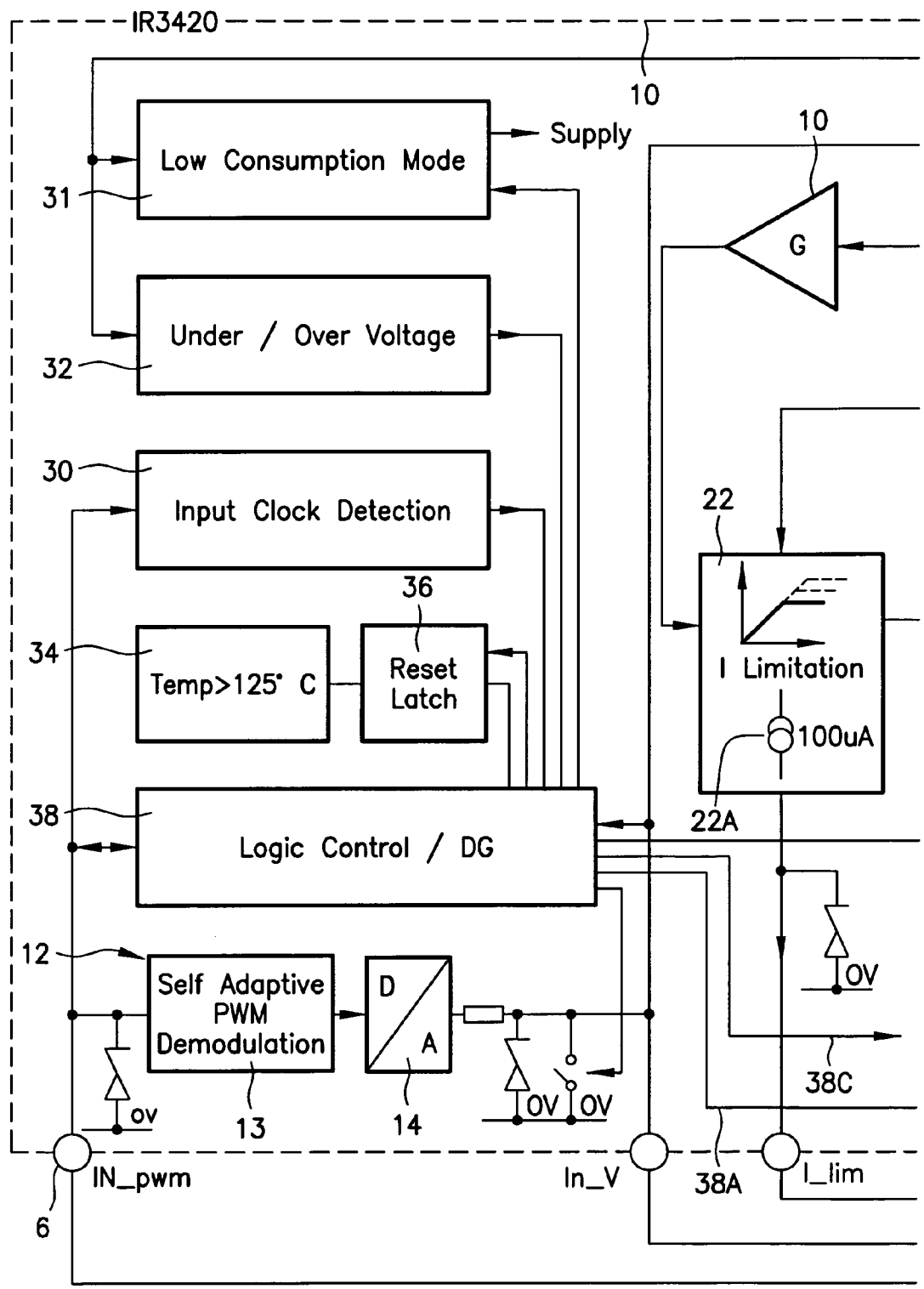
FIG. 1 is a block diagram of the motor controller according to the present invention.
Figure 1B:
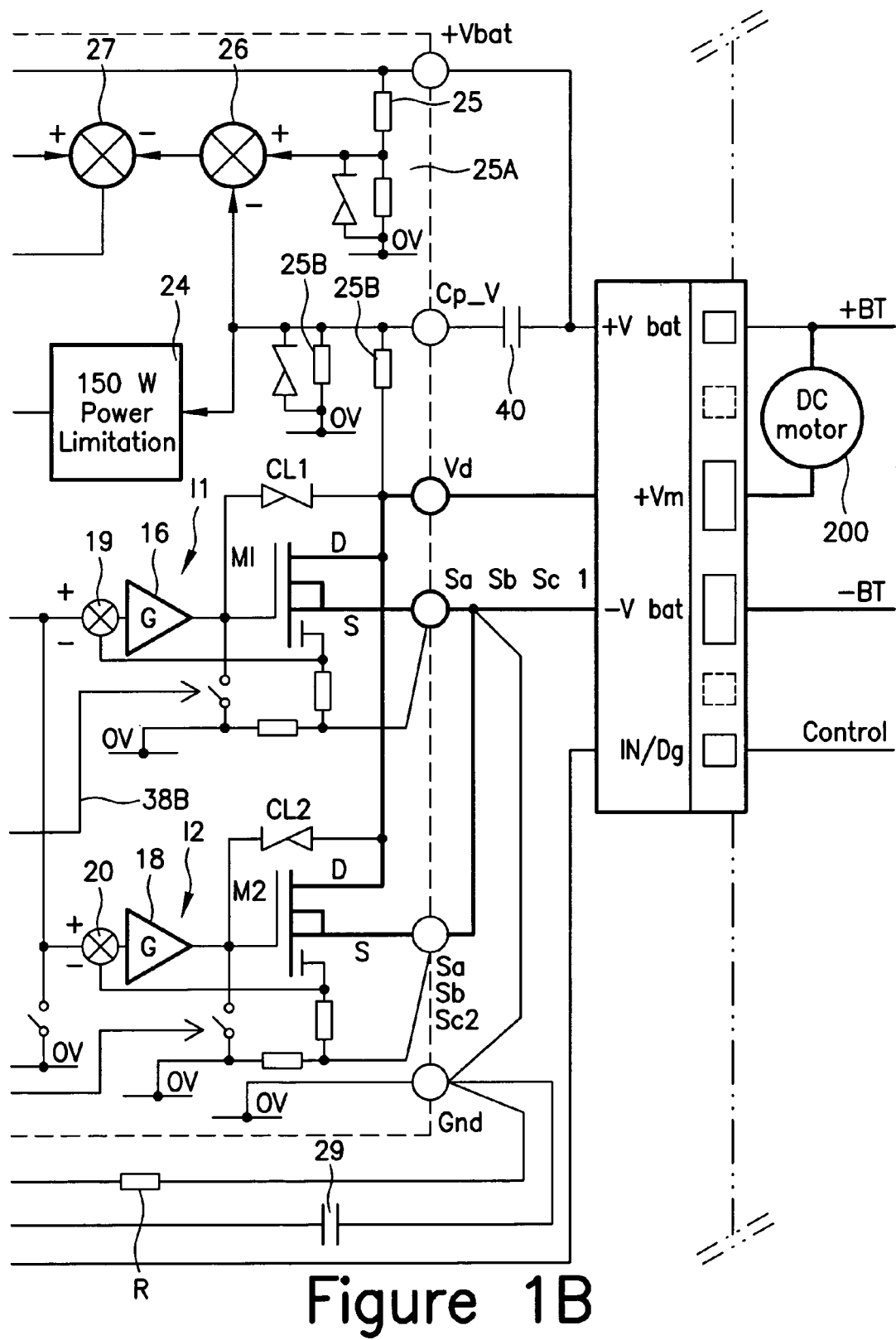

FIG. 22 shows a schematic diagram of the motor controller of FIG. 1.

Other objects, features and advantages of the invention will be apparent from the following detailed description.

DETAILED DESCRIPTION OF PREFERRED EMBODIMENTS OF THE INVENTION

With reference now to the drawings, FIG. 1 shows the block diagram of the motor controller. Reference numeral 10 is the controller integrated circuit which controls a load such as a DC motor 200. In particular, motor 200 may be a cabin fan blower drive motor for an automobile HVAC (heating, ventilating and air conditioning) function. Torque and speed control loops as well as a programmable speed response time are motor drive functionalities provided by the circuit. The controller 10 includes a PWM/analog interface 12 comprising a PWM demodulator 13 and a digital to analog converter 14. The purpose of components 13 and 14 is to convert an input PWM signal on line IN_PWM to an analog signal on line IN_V. The PWM to analog converter, as well as the logic control, the controller sleep mode, temperature management and short circuit protection, all to be described below, are also embedded in the controller 10. The controller 10 comprises a hybrid of digital, analog and power circuitry.

Turning again to FIG. 1, the output stage preferably comprises two current sensing power MOSFETS M1 and M2 operating in the low side position and having their power terminals arranged in parallel. Accordingly, the sources of the two MOSFETS M1 and M2 and the drains of the two MOSFETS M1 and M2 are connected together as shown. The drain output is provided to the low side of the motor load 200 with the other side of the load being connected to the B+ power supply +V bat. The gates of the two MOSFETs are not connected in parallel, as will be explained below, so that the current in each MOSFET can be independently regulated.

The sources are connected to a −V bat, which is also ground. Although two MOSFETs are shown, having their main terminals in parallel, the circuit could use a single MOSFET. However, the use of two MOSFETs increases the power dissipation capability and the two current control loops allow for independent regulation of the current in each.

The gates of the two MOSFETS are respectively driven independently by gate drivers 16 and 18. A current sense from an additional source and source resistance for each MOSFET is fed back via summers 19 and 20. The positive inputs to the summers 19 and 20 are in parallel. Other current sensors can be used, for example, resistors in the main source-drain circuits.

Each of the MOSFETS M1 and M2 is thus driven as an independently controlled current source in a respective current control loop. Each features an active clamp protection, CL1 and CL2. The load current is actively split between the two devices. The power dissipation is thus distributed between two silicon dice and the maximum junction temperature increases are therefore limited.

Block 22 comprises a current limitation block, I limitation. The I limitation block provides the same output command to both low side MOSFET current control loops. The maximum load current is programmed via an external resistor R. In case of excessive power dissipation, for example above 150 watts, this maximum is decreased and controlled by the over-power protection block 24. Whatever the speed loop operation, the motor current cannot exceed the lowest limitation value between the current limitation I_lim programmed by resistor R and the power limitation circuitry 24.

Accordingly, each MOSFET switch has its own independent current control circuitry via the current sensors, the summers 19 and 20 and the gate driver stages 16 and 18, each driven by current limiting block 22.

Power limitation circuitry 24 monitors the voltage across the two MOSFETS Vd via a resistor divider stage 25B. It generates the maximum acceptable current in each drain corresponding to a total power dissipation of 150 watts. This functionality overrides the current limitation I_Lim programmed value every time the circumstances tend to exceed the maximum power capability both in transient and steady state.

The motor voltage is sensed via two resistive dividers 25A and 25B that take into account the battery voltage +Vbat and a difference signal is generated by difference stage 26. This feedback is compared to the analog speed input IN_V from the output of the digital to analog converter 14 via difference stage 27 and amplified by amplifier 28 in order to maintain a constant motor speed. Motor voltage is compared to the battery voltage at stage 26 and this feedback is compared to the analog speed input IN_V by stage 27 and then amplified by amplifier 28 to maintain a constant motor speed. A filter capacitor 29 slows down the speed variations in order not only to comply with the HVAC system requirements but also to prevent a transient response to the power limitation effect on the speed. The PWM interface 12 generates the voltage on IN_V but it can also be forced via a resistor if an external analog speed input is provided instead of a PWM input.

The PWM interface 12 features self-adaptive circuitry that covers input frequency from 60 Hz up to 3000 Hz without any adjustment or oscillator synchronization. It translates the duty cycle, that is, the on state duration vs. the period, into a stable analog speed command. A permanent logic level on the IN_PWM input has no effect. The PWM interface is described in greater detail in U.S. patent application Ser. No. 10/974,581, filed Oct. 27, 2004 and assigned to the assignee of this application (IR-2505), the entire disclosure of which is incorporated by reference herein.

Quiescent consumption is reduced when both the IN_V and IN_PWM terminals have not sensed a speed command for a fixed time. This is called sleep mode. This circuitry, which will be described in greater detail below, disconnects the controller 10 with the exception of the input clock detection block 30.

Input clock detection block 30 is optimized for low current consumption. It detects the presence of a PWM speed command by monitoring the edges of the IN_PWM terminal. It wakes up the controller as soon as a rising edge is detected. Preferably, it also monitors the analog signal IN_V. If both a rising edge is detected on IN_PWM and the IN_V is greater than 0.6V it enables the duty cycle translation into a speed command by the PWM interface 12. When in sleep mode, power supply for the logic circuitry goes into a low power consumption mode. If both no rising edges or IN_PWM are detected for a certain time and IN_V is less than about 0.6 volts, the controller goes into sleep mode.

Under/over voltage block 32 stops the motor when the battery voltage goes either higher than 18 volts or lower than 8 volts. Discharging the IN_V terminal makes the motor switch off smoothly. A soft-start sequence speeds up the motor again when the battery voltage recovers.

Temperature block 34 comprises a temperature sensor embedded in the controller 10 die. This block shuts down the controller when the MOSFET junction temperature is monitored higher than 125° C. This temperature protection is latched by a latch 36 and a feedback diagnostic sequence is sent on the IN_pwm terminal to the HVAC processor 52. Accordingly, the terminal IN_PWM serves a dual function, as the speed control input and for diagnostic analysis functionality. A low level on the IN_pwm pin for a minimum time resets this protection.

Logic control/diagnostic 38 provides speed input management and diagnostics. Logic block 38 shorts to ground via signals 38A, 38B and 38C the current control loops as well as the MOSFET gates when the controller is switched off. The associated timing releasing all signals on power up is also implemented in this circuit. The sleep mode and battery management as well as the overtemperature diagnosis are also generated in this block.

The voltage ripple due to the motor 200 brushes is filtered by a capacitor 40. It is provided between the battery voltage +Vbat and speed feedback Cp_V. When I_lim and IN_V are left open, the maximum motor current is internally set at 40 amps. Both the 150 watt power limitation and the thermal shutdown will still fully protect the application in case of overload, stalled rotor condition or short circuit, as will be explained below.

Capacitor 29 coupled to IN_V introduces a soft speed control and helps reduce the energy clamped by the MOSFETs M1 and M2. For low power motors, a better protection level is achieved by programming resistor R on the I_lim terminal. This input can be dynamically driven by external components in order to comply with a specific current protection profile. For example, a resistive divider between terminal IN_V and I_lim offers a simple way to achieve a variable current protection linearly adapted to speed. The terminal IN_V can also be forced or reduced by external components such as heat sink temperature sensors or any other circuitry. Finally, the current and speed control loops can be combined in order to achieve complex and refined strategies.

Accordingly, the controller 10 employs both current and speed control loops to control the operation of motor 200.

Controller 10 integrates the entire cabin fan drive functionality, including the power switches, in a single integrated circuit package. The high level of integration not only improves the application reliability but also offers a high standard of performance at a lower cost. The dual MOSFET topology associated with embedded thermal management reduces the design effort to optimize the cooling performance and requires selecting only a few external passive components.

Turning to FIG. 22, this figure shows the schematic diagram of the controller in greater detail. The PWM input IN_PWM is shown at 6. The PWM input IN_PWM is provided to the PWM interface 12 as previously described which receives a clock signal from a clock generator 12A. The output of the PWM interface 12 is the analog signal IN_V. The output of the PWM interface is provided to a voltage or speed regulation loop V, which as described previously, provides a motor voltage proportional to motor speed from the battery voltage and motor feedback voltage via the dividers 25A and 25B. The output of stage 27 is amplified by amplifier 28 and provided to the I limitation stage 22, comprising a current limiting stage 22A and a power limiting stage 22B, which is controlled by stage 24A, which monitors voltage Vd via divider 25B. As previously described, the power limiting stage will override the current limiting stage if the total power exceeds a predetermined level, for example 150 W. The output of the I limitation stage 22A, 22B is provided to level shifter 31. The output of the level shifter 31 is provided to the two current regulation control loops I1 and I2 to independently control the current through each of the switches M1 and M2.

Figure 2:
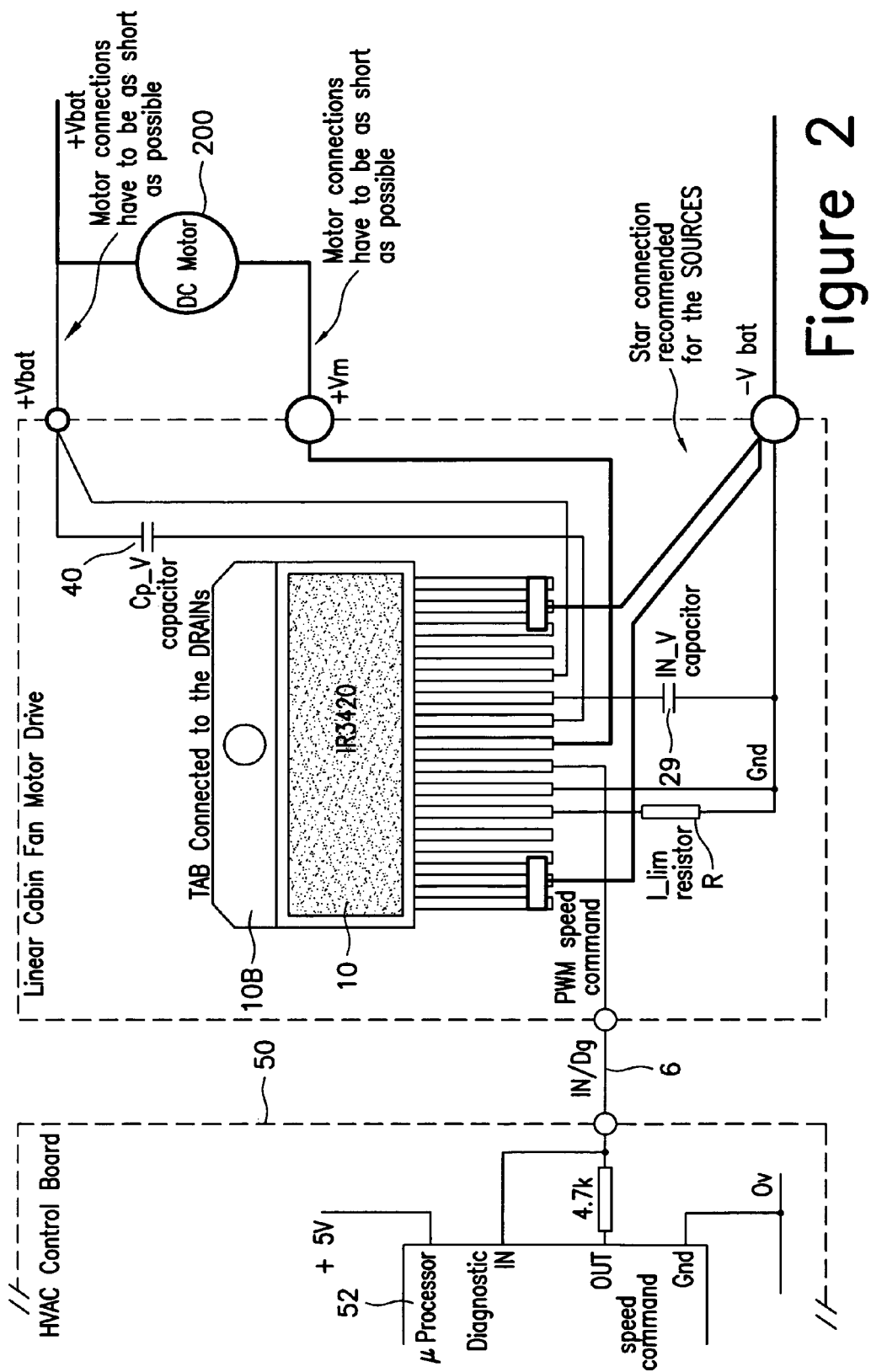
FIG. 2 shows the connection of the integrated circuit of FIG. 1 to the microprocessor controller and to the load DC motor.

Turning now to FIG. 2, this figure shows the control IC 10 implemented as a 15 pin package. The PWM speed command IN_PWM is provided at 6. An HVAC control board 50, part of the automobile HVAC control system, typically comprises a microprocessor 52. The I_lim resistor R is shown connected to the controller 10. Also shown is the IN_V capacitor 29. The sources of the MOSFETs are connected to −V bat and capacitor 40 is connected between the battery voltage and the motor voltage feedback CP_V. The controlled side of the motor+VM is connected to the drains of the MOSFETs M1 and M2.

Figure 3:
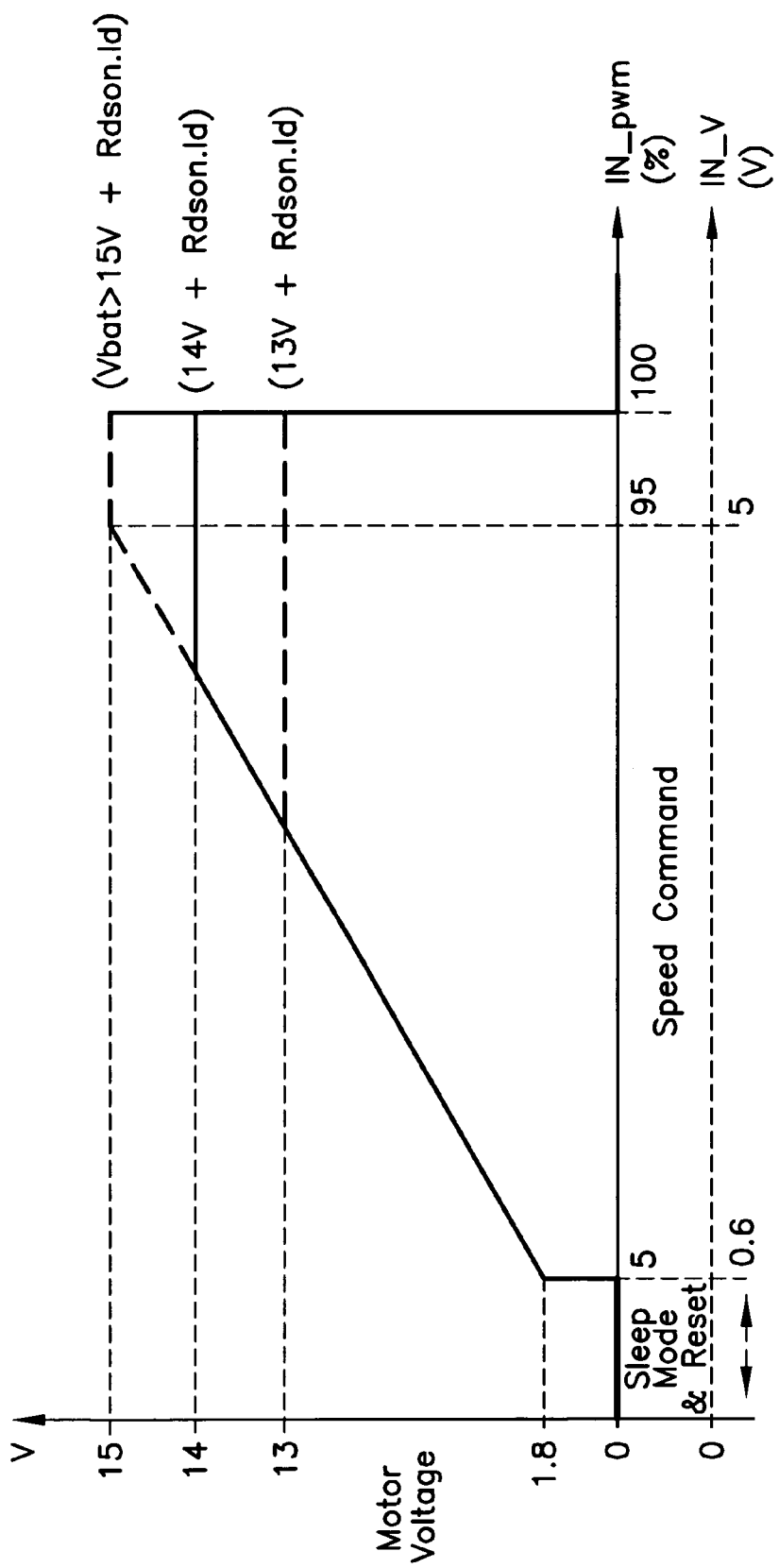
FIG. 3 is a graph of motor voltage versus the speed command.

Turning now to FIG. 3, a graph of motor voltage versus speed command (in duty cycle) and analog voltage IN_V is shown. The speed command is a low frequency PWM signal provided by the HVAC control board 50. The pin IN_PWM may have a Schmitt trigger interface and is preferably electrostatically discharge protected. Input immunity is preferably provided high enough to avoid any logic ground connection in most applications. The duty cycle on the IN_PWM pin is read as a speed request that is converted into an analog command IN_V. This signal drives the speed variation time constant and the voltage motor loop V. Both characteristics are shown in FIG. 3 on a single motor voltage transfer curve.

FIG. 5 shows an example of the PWM input and the analog output IN_V.

Figure 4:
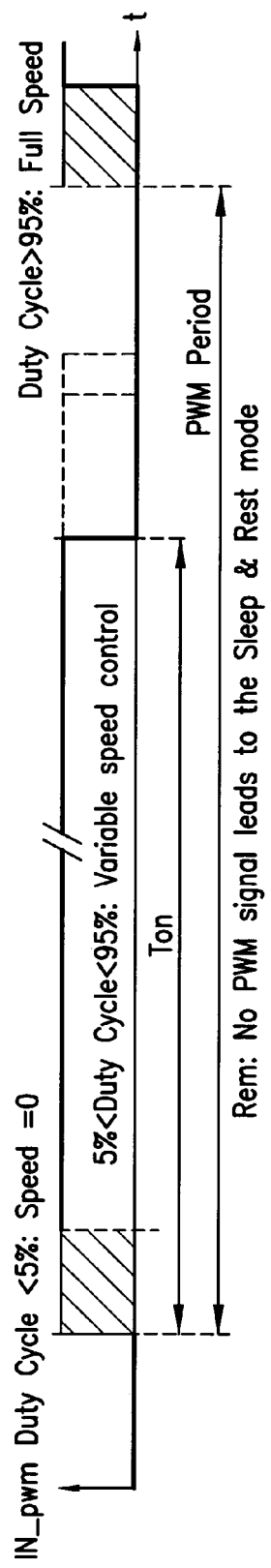
FIG. 4 shows the range of the input PWM signal.

The PWM to analog voltage converter is not affected either by the input frequency or battery voltage variations and thus is a self-adaptive interface. The duty cycle range is from 5 to 95% with a carrier frequency between 60 Hz and 3000 Hz. When it is lower than 5%, the IN_V pin is pulled down below 0.6 volts so that the motor is no longer powered. When the duty cycle is higher than 95%, the IN_V pin is maintained at 5 volts. See FIGS. 3 and 4. This represents a constant 15 volt voltage on the fan motor 200 whenever the battery is itself higher than 15 volts (plus the MOSFET voltage drop). The IN_PWM signal needs to be stable more than a predetermined time, e.g., 10 milliseconds, to be accurately converted and transferred to the IN_V pin. If there is no signal for more than a certain time, e.g., 260 milliseconds on the IN_PWM input and if the IN_V pin is lower than 0.6 volts, the controller is turned into the sleep and reset mode. The controller wakes up as soon as rising edges are again detected on the IN_PWM signal pin or IN_V>0.6 volts. This is shown in FIG. 4.

The IN_V capacitor 29 and the internal circuit impedance limit the speed variations. The associated time constant acts during the ramp-up as well as the slow-down. In addition, capacitor 29 is discharged through a resistor every time the duty cycle becomes lower than 5%. This second time constant offers a soft turn-off time that limits the EMI perturbations and helps the demagnetization (active clamp).

The thermal protection will definitively shut down the application in case of excessive MOSFET junction temperature. The HVAC control board 50 is informed by the diagnosis sequence Dg transmitted on the IN_PWM pin. This sequence consists in a 13 Hz −50% duty cycle pull down signal forced on input via a 1 k impedance. By adding a simple resistor in series with its own output, the HVAC μ processor is then able to detect the Dg sequence. This is shown in FIG. 6, which shows that after a thermal shutdown, a 13 Hz diagnostic sequence is forced on the pin IN_PWM, which can be read by processor 52.

The maximum motor speed variation is usually limited to a few volts/seconds. The external IN_V capacitor 29 and the internal impedance of the circuitry (about 100 Kohms) are the parameters of this time constant. An optimized value for the capacitor can be reached with some tests but as a first estimation, it has to cover the mechanical inertia of the whole application. The power limitation circuitry 24 (150 W) also brings a constraint on this time constant. If speed transients are too fast, the limitation may sometimes be activated and may generate an uncomfortable effect in the form of acoustic noise variation. Finally, the IN_V capacitor 29 also determines the softness of the motor turn-off. Among all these criteria, the mechanical time constant usually dominates. See FIG. 7.

Measuring the direct start inrush current profile is the easiest way to estimate this time constant. The application speed variation requirements can also be directly translated into a capacitor value. In both cases, a 0–100% speed variation test at the maximum battery voltage is needed in order to verify the absence of any power limitation effect during speed transients.

The I-Lim resistor R limits the maximum current provided to the load. Although it can be adjusted dynamically by forcing a voltage (0 to 5V), the I_Lim circuitry preferably has a 100 $\mu$A current source 22A. See FIG. 1. A simple resistor can provide programming. This value has to be set with some margin just higher than the maximum normal operation current (max. load at the highest battery voltage). It is usually the maximum current acceptable by the vehicle wiring harness. FIG. 8 shows the I_Lim characteristics. In the illustrated embodiment, the current limitation range is from 4 to 40 A. The graph shows the maximum load current as a function of the programmed I_Lim voltage or resistance R.

Subtracting the Vd voltage from the Vbat voltage via stage 26 senses the motor speed. This signal is filtered in order to eliminate the ripple due to the brushes. The filter is composed of the internal impedance of the voltage sensor and the Cp_V external capacitor 40. A 47 nF ceramic capacitor is usually enough to guarantee a reliable speed feedback to the speed/voltage control loop.

The maximum power dissipation can be evaluated either by test or by simulation. From the electrical characteristic of the motor measured in the actual housing and with fan attached, (current Vs. voltage), the power dissipation profile corresponds to the voltage drop across the MOSFEST multiplied by the motor current for each motor voltage. This profile should be established for the application worst case; usually 16V battery voltage and 70° C. Airflow. An example of a motor characteristic and the associated power profile is presented in FIG. 9.

In the example of FIG. 9, the maximum power dissipation is 90 W when operating at 16V battery voltage. The heat sink Rth size can be determined assuming the 70° C. airflow and the thermal resistance flow chart of FIG. 10.

FIG. 10 summarizes the whole heat transfer through the I.C. The total amount of power is split between the two MOSFET dice while the I.C. thermal shutdown is symbolized as a "resistive divider" Rth1 and Rth2 on each MOSFET. Although it does not reflect the exact assembly technology, this representation is accurate and helps understand the ultimate thermal protection mode. The typical values of this equivalent schematic are the following:
  a) Rth MOSFET die/leadframe=1.4° C./W per MOSFET (actual value-assembly technology)
  b) Rth MOSFET die/I.C. sensor=Rth 1=0.8° C./W per MOSFET (equivalent thermal divider)
  c) Rth I.C. sensor/leadframe=Rth 2=0.6° C./W per MOSFET (equivalent thermal divider)
  d) Total Rth 2×MOSFET dice/leadframe=0.7° C./W for the I.C.

For this example, the half power amount is 45 W. Each temperature increase is shown and the heat sink Rth is then evaluated as follows [Airflow$^\theta$-lead-frame$^\theta$]/Pmax. This result is the total Rth requirement for the cooling system. Isolating washers, thermal grease or any specific mounting technology has to be included in this Rth budget. The heat sink Rth is then re-used in order to estimate the MOSFET's junction temperature in normal operation conditions (14V battery voltage −50%C airflow −Pmax@ 14 v).

In the example of FIG. 11, the maximum junction temperature in normal condition would be limited to 130° C. Such a value would make the application capable of achieving low PPM failure rates. In the motor power range of the controller of the invention, the temperature difference between the heat sink and the I.C. sensor typically exceeds 15° C. Due to the I.C. thermal shutdown (125° C.) and whatever the circumstances, the heat sink temperature remains compatible with the HVAC system plastic housing (110° C.).

In addition, the inner temperature increases will never exceed the temperature increase corresponding to a total power dissipation of 150 W because of the power limitation control 24. Therefore, by designing an optimized heat sink, the entire application can function without any external temperature sensor. The over-temperature protection 34 however shuts down the whole application in case of "abnormal thermal overload" without any risk to either the silicon or the fan motor.

The I.C design architecture makes the controller able to operate in the harsh automotive environment (ISO pulses, reverse battery, load dump, etc.) with few external components. The positive and negative pulses are clamped through the motor path and the reverse battery condition does not affect the I.C itself merely resulting in the fan spinning in reverse due to the MOSFET body diodes. The speed ramp-ups and slow-downs are limited by the IN_V capacitor 29. This time constant is also used in order to smoothly turn off the fan. In addition, the active clamp circuitry makes each MOSFET behave like a power zener diode. The motor inductive energy is then dissipated in one of the transistors M1 and M2 after every turn-off. The active clamp is set just higher than the maximum load dump voltage. During the load dump profile, the controller 10 switches off well in advance so that the active clamp dissipates the inductive energy prior to the maximum peak voltage.

FIG. 12 shows the motor voltage and current responses to a PWM speed command.

When the battery voltage exceeds the normal operation range or in case of a thermal shutdown, the MOSFET gates are pulled down through a 100 k ohm resistor. These high gate resistors still offer a soft turn-off profile so that the inductive energy dissipated by the transistors remains well below their energy capability. During a load dump condition, the controller 10 switches off the motor 200 and discharges the speed time constant capacitor 29. When the battery voltage recovers, a soft start sequence is initiated in order to smoothly reach the speed command again. It should be mentioned that when the battery is suddenly disconnected, the speed loop in reaction fully turns on the MOSFETs. The motor back EMF then powers the controller 10 until the Vbat pin voltage goes below the Under Voltage threshold. The whole application actually sustains the short battery voltage drops due to the rotor/propeller inertia. The circuitry switches off the output as soon as the battery voltage goes below 8.5V or exceeds 18V. This results in a light discharge of the IN_V capacitor 29 so that a restart "in flight" is possible. The turn-off waveform is slow and soft so that clamp dissipation is limited. FIG. 13 presents the same sequence but with a load dump profile. As shown, when the over-voltage due to a load dump is sensed, the over-voltage protection operates. The motor voltage is clamped, capacitor 29 is discharged and when the battery voltage again reduces below 18V, a soft start is implemented.

Controller 10 is able to protect the whole application (I.C and Motor) as long as the associated heat sink is properly sized and located in the corresponding airflow. The various natures of the faults actually lead to three key cases:

a) Motor in stalled condition. Purposes of the protection are to prevent the "burning smell" in the cabin generated in this case and to keep the motor from being damaged.

b) Short-circuit. In this case, the protection protects the I.C itself from damage.

c) Over-load. The root cause of the overload can be either in the HVAC system or in the motor/fan itself. In both cases, it represents a long and repetitive over-stress for both the motor and the I.C. An important purpose of the protection is to avoid the continuous or repetitive effects of the over-stress.

The three cases are covered by the embedded circuitry in the controller 10, including Programmable Current Limitation 22, Maximum Power Limitation 24 and the Junction Temperature Shutdown 34. The two MOSFETS are driven by two independent control loops to provide further protection. The total current in the motor cannot exceed the programmed value. Even when the I_Lim pin is left open, the maximum current in the motor cannot exceed 40 A. The short circuit current is then limited so that the MOSFET dice can sustain the condition permanently. If the total power dissipation in the MOSFETS is higher than e.g., 150 W due to the fault condition, (it is usually the case), the current of the short circuit will be reduced to a lower value than the programmed I_Lim value. This low continuous current does not damage either the application or the wiring harness. Finally, the controller 10 will definitively switch off the application when the I.C temperature reaches the shutdown threshold. The above covers all the three cases mentioned. In addition, the heat sink temperature never reaches the maximum temperature sustainable by the HVAC housing plastic. The combined actions of the protection are summarized in FIGS. 14, 15 and 16.

FIG. 14 shows the operation in the event of an overload. The motor current is limited to maintain the power consumption to 150 W, and if the thermal overload temperature is reached, the motor is deactivated.

FIG. 15 shows the operation in the event of a short circuit. When I-Lim is reached, the power limiting circuit 24 reduces the moto current and, if there is thermal overload, the motor is deactivated.

FIG. 16 shows the operation in the event of a stalled rotor. It is similar to the case of FIG. 15 when the current exceeds the I-Lim limit. The dotted lines show the case of a stalled condition at low speed, which is similar to the overload condition of FIG. 14.

The controller 10 could be either packaged in a through hole SIP 15 pin package, which is Q100 automotive compatible, or on any other substrate that can house 3 dice on the same heat-spreader. The part is composed of three different dice: two MOSFETs, e.g., 2×GEN 7.0. Hexfets available from International Rectifier Corporation and 1 driver I.C 10A. The MOSFETs are soldered on the lead-frame while the I.C. is isolated. This is shown in FIG. 17. This mixed technology offer a simple and reliable solution for a complex application. The shape of the lead-frame is also adapted in order to support high current connections (the sources pins are fused) and the Tab 10B (FIG. 2) is also available pin #8 (40 A continuous current capability). Since the MOSFETs are soldered, the Tab is connected to the output pin (MOSFET Drains). FIG. 19 shows a side view.

The profile presented takes into account the total power dissipated in the controller 10. It represents the transient Rth of the controller assuming the total amount of power dissipated in the two MOSFETs. Although it increases the steady state value up to 0.7° C./W, the use of a thermal compound between the controller and the heat sink is preferable.

The I.C has an embedded temperature sensor. It has to be assembled between the power MOSFETs. See FIG. 17A. The feedback is then delayed compared to the actual MOSFETs temperature. This thermal response time is taken into account in the I.C design (architecture and protection). As shown in FIG. 20, for a 150 W power step, the delay is about 20 ms. FIG. 18 shows the MOSFETs junction temperature over time for 150 W power dissipation and a heat sink temperature of 20° C.

In order to simplify the heat sink design and junction calculations, all the thermal impedances shown will now integrate the effect of the thermal compound (0.3° C./W max.). This is assuming a constant pressure on the whole package of (TBC) 20 kg. The Rth structure of the controller is presented in FIG. 21 but now with the actual Rth's to be used for the heat sink design. They correspond to the Max. values and include not only the thermal compound but also the process variations.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A motor drive comprising:
   a first power semiconductor switching device having a pair of main current carrying terminals, the main current carrying terminals being coupled in series with a motor load;
   a first current control loop, the current control loop having a current sensor for the switching device for controlling the current through the switching device;
   a current limiting circuit driving the first current control loop to maintain the current in the switching device at a desired level, the current limiting circuit having first and second inputs;
   a speed regulation circuit having a first input coupled to a speed control input and a second input coupled to a feedback voltage from the motor representing the actual motor speed, the speed regulation circuit providing an output to the first input of the current limiting circuit to drive the motor to the desired motor speed; and
   a power limitation circuit for limiting the power consumed by the motor to a predetermined level and providing an output to the second input of the current limiting circuit, the power limitation circuit having an input coupled to receive the feedback voltage from the motor.

2. The motor drive of claim 1, further comprising a second power semiconductor switching device having its main current carrying terminals connected in parallel with the main current carrying terminals of the first power switching device; and further comprising a second current control loop, the first current control loop coupled to drive the first power switching device and the second current control loops coupled to drive the second power switching device, the first and second current control loops being driven by the current limiting circuit, with the current in each power switching device being independently regulated by the respective first and second current control loops.

3. The motor drive of claim 1, further comprising a PWM to analog converter for converting a PWM signal representing the desired motor speed to an analog signal, said analog signal being provided as the speed control input to said speed regulation circuit.

4. The motor drive of claim 2, wherein the first and second power semiconductor switching devices each comprise a power MOSFET and wherein the current sensor comprises a current sensor in a drain-source path of each MOSFET, further comprising a difference stage for comparing a signal representing a desired current with a sensed current and producing an error signal driving a driver stage for driving the gates of each of said MOSFETs independently thereby to regulate the current independently in each MOSFET to a desired level.

5. The motor drive of claim 2, wherein the current limiting circuit comprises a circuit providing an output to each of said first and second current control loops based on an input signal from the speed regulation circuit, said current limiting circuit limiting the current in said motor load at a predetermined maximum level.

6. The motor drive of claim 1, wherein the speed regulation circuit comprises a first input signal related to the motor speed, a second input signal related to the power supply voltage to the motor load, a difference circuit for providing an error signal proportional to the difference between the power supply voltage and the motor voltage, further comprising a second difference circuit for comparing the output of the first difference stage to a desired speed signal and for providing the output of the second difference stage to said current limiting circuit as a speed error signal.

7. The motor drive of claim 6, further comprising an amplifier amplifying the signal from the second difference stage and providing an amplified signal to the current limiting circuit.

8. The motor drive of claim 1, wherein the power limitation circuit comprises a circuit for limiting the power dissipated in the motor load to a predefined maximum level and which controls the current limiting stage to limit the current so that the power dissipated in the motor load is below the predefined level.

9. The motor drive of claim 8, wherein the power limitation stage has an input coupled to a voltage across the motor load.

10. The motor drive of claim 9, further comprising a capacitor coupled between the power supply voltage and said voltage across said motor load.

11. The motor drive of claim 1, further comprising a capacitor coupled to said speed control input where the speed control input comprises an analog voltage.

12. The motor drive of claim 3, wherein the PWM to analog converter comprises a pulse width modulation demodulator for demodulating a duty cycle of a pulse width modulated signal into a digital signal and a digital to analog converter for converting the digital signal into an analog voltage proportional to a desired motor speed.

13. The motor drive of claim 4, further comprising a logic control for monitoring the speed control input and transitioning to a low power consumption mode if the speed control input is below a first predetermined level.

14. The motor drive of claim 13, further wherein if the speed control input is above a sensed predetermined level, the motor load goes full speed.

15. The motor drive of claim 3, wherein the speed control input is a PWM signal and wherein if the duty cycle of the PWM signal is below a first predetermined level, the motor drive turns off said motor load and if the duty cycle is above a second predetermined level, said motor drive operates said motor load at full speed.

16. The motor drive of claim 15, further wherein a logic control monitors said input PWM signal and if there are no edges in said PWM signal for a predetermined time period, said logic control transitions into a low power consumption mode.

17. The motor drive of claim 13, wherein said logic control monitors an analog signal representative of said desired speed and if said signal is below a predetermined voltage, said logic control transitions into a low power consumption mode.

18. The motor drive of claim 13, further comprising a temperature sensor for monitoring the junction temperature of said MOSFETs and if said junction temperature exceed a predetermined maximum, said logic control turns off said MOSFETs.

19. The motor drive of claim 13, wherein said logic control is provided with outputs to drive the gates of said MOSFETs to turn said MOSFETs off and further is provided with an output to turn off the inputs to said current control loops.

20. The motor drive of claim 15, further comprising an input clock detection circuit for determining if said input PWM signal contains pulses in a predetermined time interval and if not, providing a signal to said logic control to transition to the low power consumption mode.

21. The motor drive of claim 13, further comprising an under/over voltage monitoring circuit for providing an input to said logic control such that if the power supply voltage is below a first predetermined level or above a second predetermined level, said power switching devices are turned off to turn off said motor load.

22. The motor drive of claim 4, further comprising at least one circuit for turning on or turning off said MOSFETs with a soft start or soft turn off.

23. The motor drive of claim 1, wherein the maximum current of said current limiting stage is provided by an external programmable resistance.

24. The motor drive of claim 22, wherein said soft start and soft turn off are provided by a capacitance connected to said speed control input.

25. The motor drive of claim 13, wherein the speed control input functions as a diagnostic output of said logic control.

26. The motor drive of claim 1, further comprising a filter coupled to said feedback voltage from the motor load.

27. The motor drive of claim 1, wherein the motor load comprises a DC motor.

* * * * *